United States Patent [19]

Terada et al.

[11] Patent Number: 5,453,812
[45] Date of Patent: Sep. 26, 1995

[54] STROBE APPARATUS

[75] Inventors: Hiroshi Terada, Mitaka; Keiichi Tsuchida, Hachioji, both of Japan

[73] Assignee: Olympus Optical Co., Ltd., Tokyo, Japan

[21] Appl. No.: 192,372

[22] Filed: Feb. 7, 1994

Related U.S. Application Data

[63] Continuation of Ser. No. 870,562, Apr. 17, 1992, Pat. No. 5,347,339.

[51] Int. Cl.⁶ .............................. G03B 13/36; G03B 15/03
[52] U.S. Cl. .................... 354/402; 354/413; 354/149.1; 354/132
[58] Field of Search ...................... 354/443, 402, 354/403, 432, 149.1, 132, 414

[56] References Cited

U.S. PATENT DOCUMENTS

| | | | |
|---|---|---|---|
| 4,457,602 | 7/1984 | Mizokami | 354/416 |
| 4,470,684 | 9/1984 | Harvey | 354/413 |
| 4,527,880 | 7/1985 | Okino | 354/403 |
| 4,692,013 | 9/1987 | Okino | 354/413 |
| 5,049,731 | 9/1991 | Ishida et al. | 354/408 |
| 5,347,339 | 9/1994 | Terada et al. | 354/402 |

FOREIGN PATENT DOCUMENTS

| | | | |
|---|---|---|---|
| 2740557 | 3/1979 | Germany | 354/132 |
| 4-9933 | 1/1992 | Japan | 354/132 |

*Primary Examiner*—Russell E. Adams
*Attorney, Agent, or Firm*—Louis Weinstein

[57] ABSTRACT

In this strobe apparatus which can be fitted to a camera having a strobe built-in or a camera, a flash comprises at least two flashing parts having respectively different light distribution characteristics, the distances to objects in a plurality of places within the photographed picture are measured and the flashing amounts adapted to the distances are operated to control the flashing amount of the flashing. Also, the flashing amounts of the first flashing part having non-uniform light distribution characteristics at the time of the full flashing within the photographed picture and the second flashing part having non-uniform light distribution characteristics substantially linearly symmetrical with the light distribution characteristics of said first flashing part with respect to the center axis are respectively independently controlled by a controlling circuit.

45 Claims, 21 Drawing Sheets

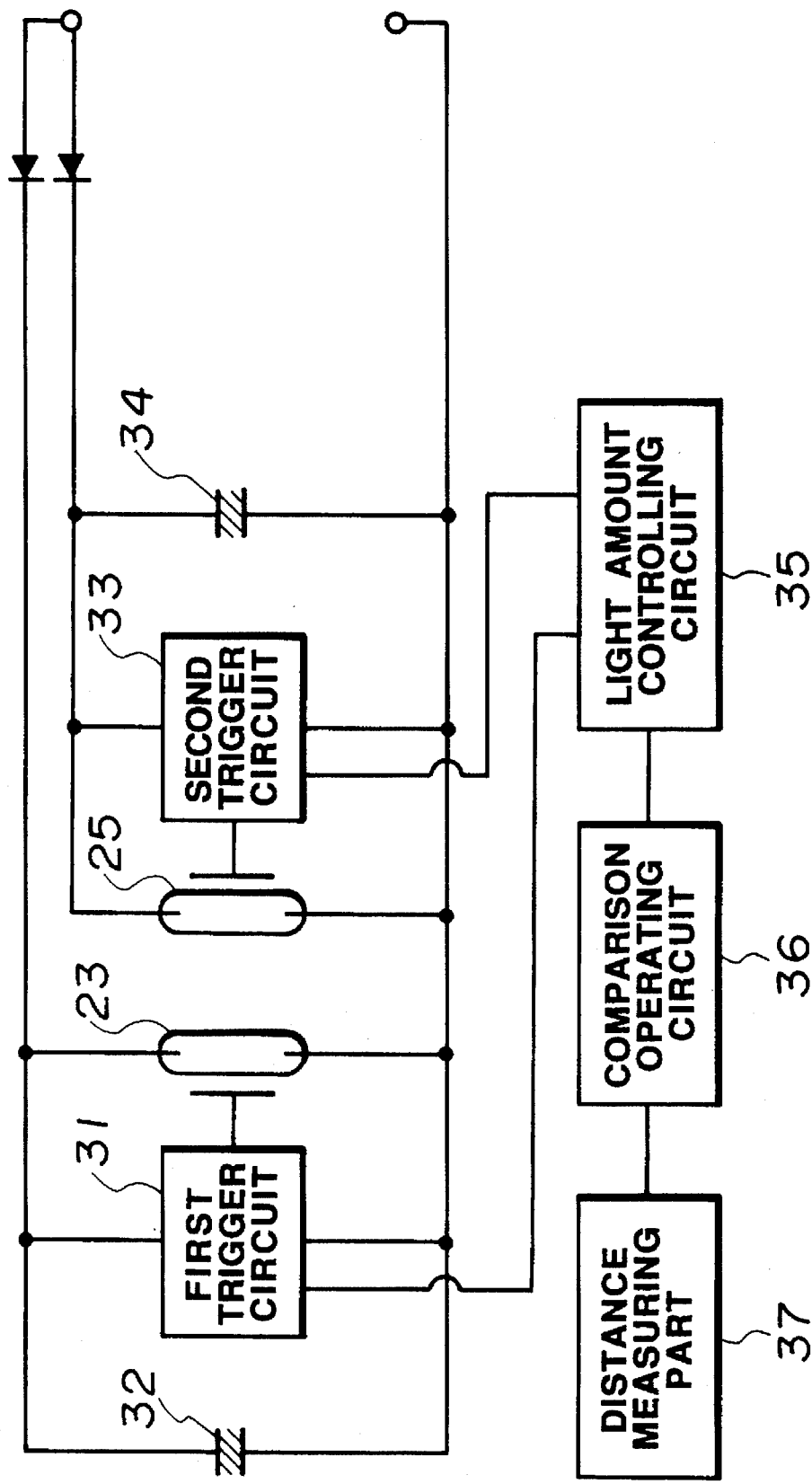

FIG. 8
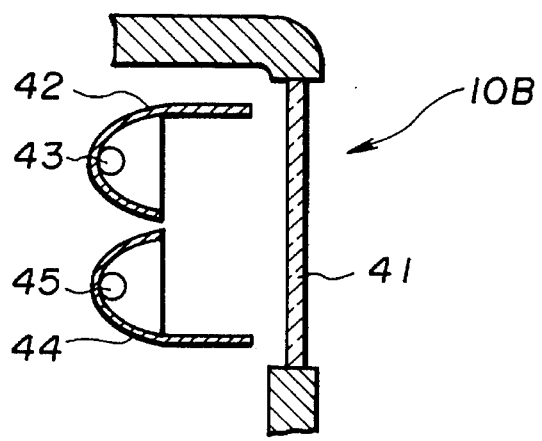
FIG. 9A  FIG. 9B
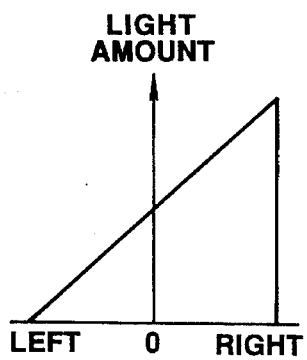 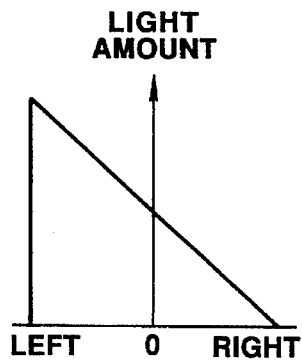
FIG. 10A
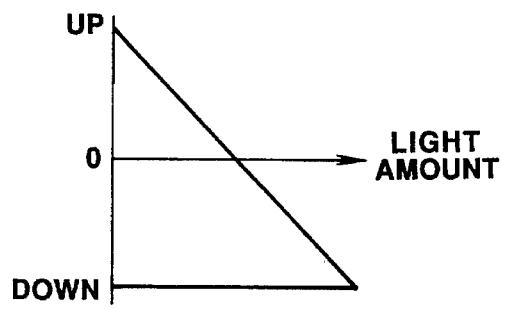
FIG. 10B
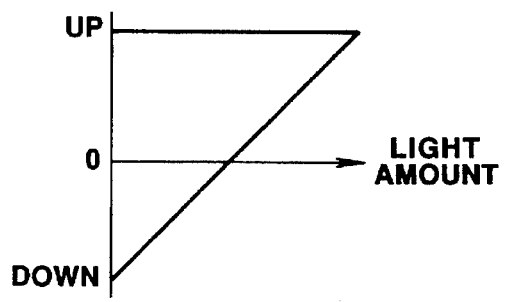

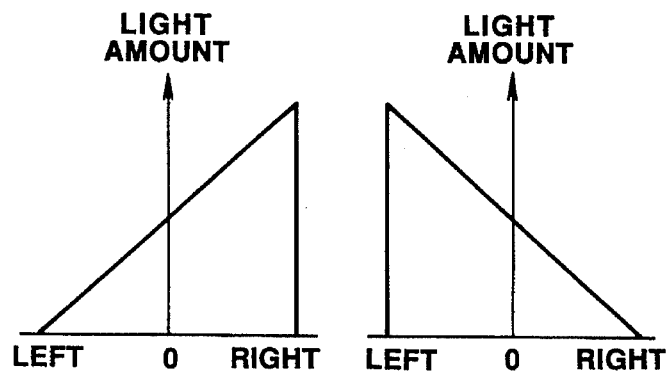
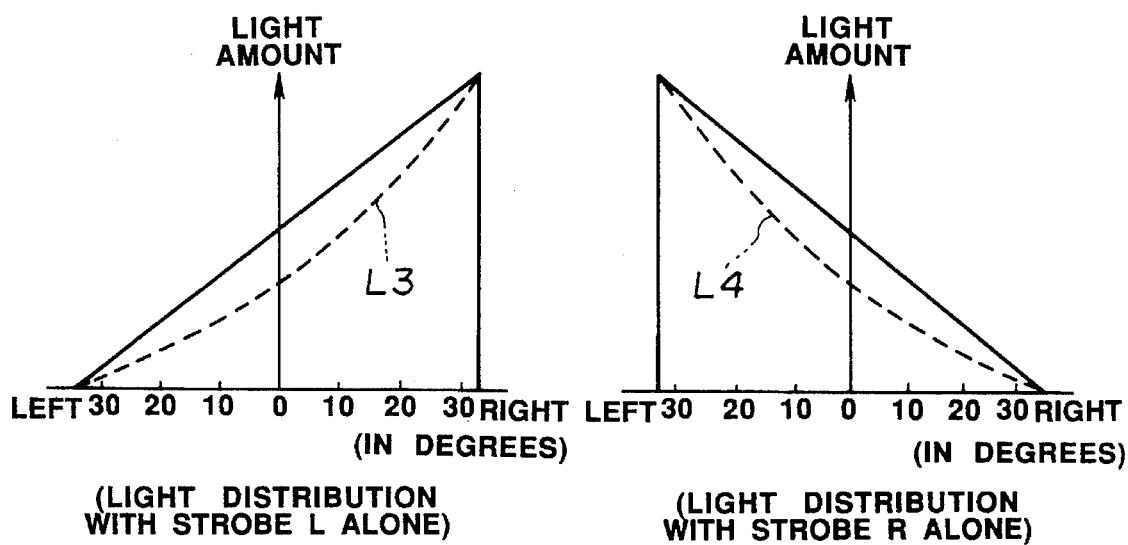

OPTICAL AXIS
DIRECTION

LIGHT DISTRIBUTION CHARACTERISTICS

STROBE APPARATUS

CROSS-REFERENCE TO RELATED APPLICATION

This application is a continuation application of application Ser. No. 07/870,562, filed Apr. 17, 1992, now U.S. Pat. No. 5,347,339.

BACKGROUND OF THE INVENTION:

1. Field of the Invention

This invention relates to strobe apparatus and more particularly to a strobe apparatus which is used for cameras and the like and has variable light distribution characteristics.

2. Related Background Art

As well known, in photographing with a camera, in case the brightness of the object is lower than a certain level, a strobe apparatus will be used. The distribution of the strobe light radiated toward the object from the camera side is usually designed to be of uniform characteristics within the photographed picture angle.

The light distribution characteristics of a conventional strobe apparatus shall be explained in the following with reference to FIGS. 45 to 49. FIG. 45 shows light distribution characteristics in the major side direction of a rectangular photographed picture in a conventionally used strobe apparatus. The abscissa represents angles on the right and left of the optical axis direction of the photographing lens and the ordinate represents flashing amounts from the strobe. The light distribution characteristics in this FIG. 45 correspond to a focal distance of 40 mm of a photographing lens in a camera for photographing a full size of a horizontally long rectangular photographed picture on an ordinary 35 mm wide roll film. As the photographing range in this case is about 25 degrees on one side within the picture angle, the light distribution pattern is set to be 30 degrees on one side with some space. Therefore, the uniform light distribution characteristics will be retained until about 25 degrees on one side within the picture angle.

In case such objects a1, b1 and c1 as are shown in FIG. 46 are photographed with a strobe apparatus having such light distribution characteristics, as shown in FIG. 47, as the distances of the positions of the respective objects a1, b1 and c1 from the position of the camera 1 having the above mentioned strobe apparatus built-in are the same distance l1, a photograph in which the entire photographed picture is substantially properly exposed will be able to be taken.

However, as shown in FIG. 49, in case the positions of the respective objects a2, b2 and c2 are not at the same distance from the strobe built-in camera 1, that is, in case a plurality of objects are at different distances within the picture angle, if such composition as in FIG. 48 is to be photographed, as the nearest object a2 is focused usually in most cases, in FIG. 49, the object a2 of the object distance l1 will be properly exposed but the objects b2 and c2 of the object distances l2 and l3 will be insufficiently exposed.

If the light distribution characteristics optimum to such object states are to be applied to such photographed picture as is shown in FIG. 48, in order to obtain a photograph in which the respective objects a2, b2 and c2 are respectively properly exposed, as shown in FIG. 50, a strobe light having light distribution characteristics corresponding to the respective object distances will have to be radiated.

However, in obtaining such light distribution characteristics as are shown in FIG. 50, there will be a defect that the mechanism of the strobe apparatus will be complicated on a large scale. Therefore, such light distribution characteristics have not yet been realized. In the conventional strobe photographing, only one , of a plurality distances within a photographed picture angle has been able to be properly exposed.

Therefore, in case it is necessary to obtain a more natural state, a multi-light flashing with a plurality of strobe apparatus or a bounce light has been used in photographing.

Further, a means wherein a light distribution within a picture angle is varied depending on the type of an object with a one-light strobe apparatus is disclosed in the publications of Japanese utility model application publication No. 28416/1984 and Japanese patent application publication No. 10921/1986. In such means, a liquid crystal or the like which can influence a part of the strobe light permeating range is arranged in front of a flashing part having a uniform light distributing pattern so that, when the shutter is released in the camera, infrared rays will be projected into the picture before the main flash to judge whether an object is located in the near distance or not and, in case the object is located there, the liquid crystal will be driven to reduce the strobe light there so that the light distribution may be varied to prevent the exposure of the object on the near distance side from becoming overexposed.

Now, in the above mentioned conventional means wherein a plurality of strobe apparatus are used or a bounce photographing is made, not only the strobe apparatus will be large and complicated but also the photographer must seek to most suitably set the respective objects and such a highly skilled art will be required that only a limited number of those skilled in the art will be able to use it but it has been difficult for the general users to fully use the conventional means.

Also, in the means disclosed in the above mentioned Japanese utility model application publication No. 28416/1984 wherein the light distribution is made variable by a liquid crystal member arranged in front of the flashing part, there have been defects that it will be necessary to provide a liquid crystal member and liquid crystal controlling apparatus having nothing to do directly with the strobe apparatus and, as the light distribution characteristics are varied by shielding the effective rays with the liquid crystal or the like, the loss by the diffusion and heat generation will be so large that, even if the desired light distribution characteristics are obtained, the light amount radiated from the strobe apparatus will be greatly reduced.

In the case of the actual use, with the means disclosed in the publication of the above mentioned Japanese patent application publication No. 10921/1986, as, prior to the main flash, in order to measure the reflected light, infrared rays are projected and then the liquid crystal is driven, the release time lag after the photographer pushes down the shutter button until the exposure is actually made will be so long that the shutter chance will be likely to be missed. Also, there has been a defect that, as it is made a main aim to reduce the strobe light to the object adjacent to the main object, it will be effective only to prevent the object mostly at the near distance from being over exposed.

OBJECTS AND SUMMARY OF THE INVENTION:

A first object of the present invention is to provide a camera having a strobe apparatus wherein the above mentioned conventional defects are eliminated, the release time lag in photographing with the strobe apparatus is little, the formation is simple and a plurality of objects in different positions can be strobo-photographed with a proper exposure.

A second object of the present invention is to provide a strobe apparatus wherein the light distribution pattern of the strobe apparatus in a strobe built-in camera or a strobe apparatus externally fitted camera can be very easily varied with a simple formation.

Briefly this invention comprises:

a distance measuring means for detecting the distances of a plurality of objects;

an operating means for determining such light distribution characteristics as make proper the exposure of at least another object than the focused object on the basis of a plurality of the distance measuring informations obtained by the above mentioned means;

a flashing means which can vary the light distribution characteristics on the basis of the information of the above mentioned operating means; and at least two flashing parts which can independently control the flashing amounts and are so set as to obtain non-uniform light distributions substantially linearly symmetrical with respect to the center axis within the photographed picture angle.

These and other objects and advantages of the present invention will become clearer from the following detailed explanation.

According to the present invention, the flashing amounts to be flashed from the flashing means comprising at least two flashing parts having different flashing characteristics are operated and controlled on the basis of a plurality of object distance measuring informations and are radiated to a plurality of objects so that the objects in different positions may be properly exposed.

Also, the first and second flashing parts are provided in the strobe flashing part and are so set that the non-uniform light distribution characteristics of the second flashing part and the non-uniform light distribution characteristics of the first flashing part may be substantially linearly symmetrical with each other with respect to the center axis and therefore the light distribution pattern of the strobe flashing part can be varied by a simple formation of only varying the flashing amount ratio of the first and second flashing parts.

BRIEF DESCRIPTION OF THE DRAWINGS

FIG. 1 is a perspective view of a strobe built-in camera in which a strobe apparatus showing a first embodiment of the present is built-in.

FIG. 5 is a block diagram showing the formation of an electric circuit of the strobe apparatus of the first embodiment.

FIG. 6 is a perspective view of a strobe built-in camera in which a strobe apparatus showing a second embodiment of the present invention is built-in.

FIG. 8 is a magnified sectioned view of a strobe flashing part on line 8—8 in the above mentioned FIG. 6.

FIGS. 9A and 9B are diagrams showing the light distribution characteristics of the respective flashing tubes in FIG. 7.

FIGS. 10A and 10B are diagrams showing the light distribution characteristics of the respective flashing tubes in FIG. 8.

FIG. 16 is a magnified sectioned view of a strobe flashing part in a wide position in a zoom camera in which a strobe apparatus showing a third embodiment of the present invention is built-in.

FIG. 18 is a magnified sectioned view of a strobe flashing part in a tele position in a zoom camera in which a strobe apparatus showing the third embodiment is built-in.

FIG. 21 is a perspective view of a strobe built-in zoom camera in which a strobe apparatus showing a fourth embodiment of the present invention is built-in.

FIGS. 24A and 24B are diagrams showing the light distribution characteristics of the respective flashing tubes in FIG. 22.

FIGS. 25A and 25B are diagrams respectively conveniently showing the light distribution characteristics at each of the strobe flashing parts of FIG. 22 alone.

FIG. 40 is a perspective view of a strobe built-in zoom camera in which a strobe apparatus showing a fifth embodiment of the present invention is built-in.

DETAILED DESCRIPTION OF THE PREFERRED EMBODIMENTS

Figure 50:
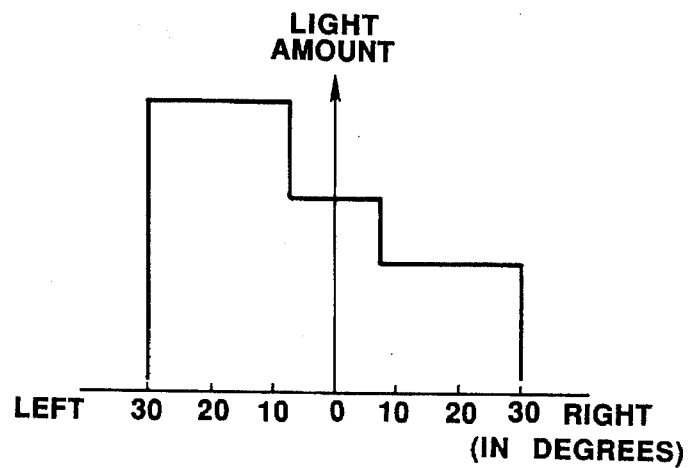
FIG. 50 is a diagram showing light distribution characteristics for properly exposing a plurality of objects located at different distances.
Figure 51:
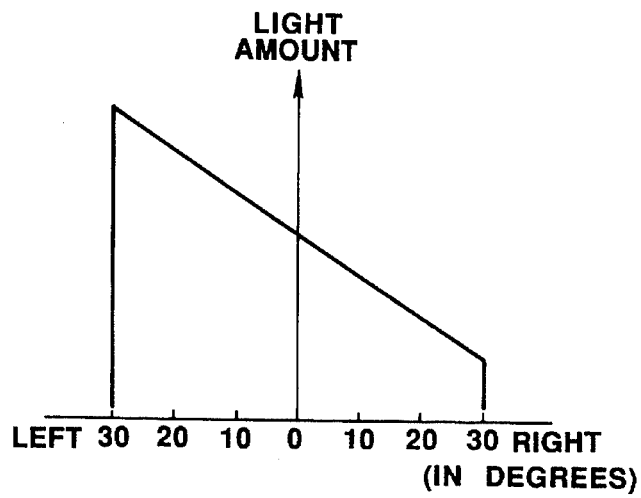
FIG. 51 is a diagram showing light distribution characteristics for explaining the basic conception of the present invention.

First of all, the basic concept of the present invention shall be explained. In order to approach the ideal light distribution characteristics in FIG. 50, the strobe apparatus of the present invention is formed so that, as shown in FIG. 51, light distribution characteristics increased in the emphasis degree on one side may be obtained and at least another object than the focused object may be photographed with a nearly proper exposure by controlling the emphasis degree on the basis of the distance measuring information of a plurality of objects.

Figure 1:
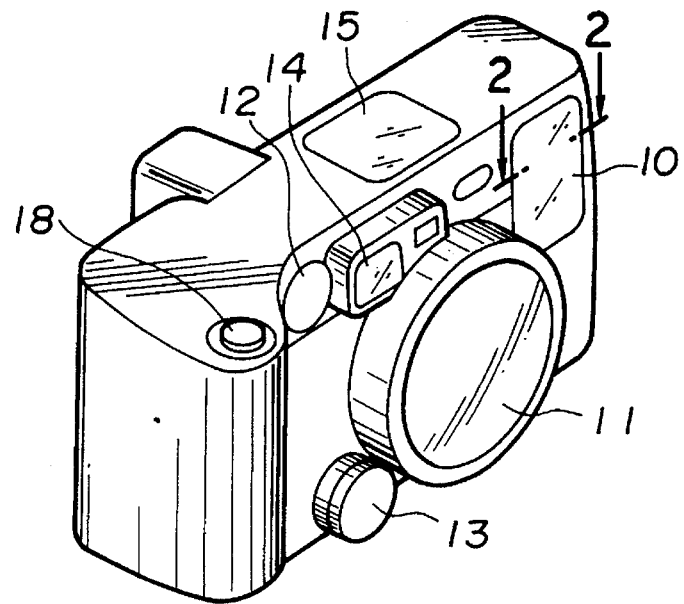

FIG. 1 is a perspective view of a camera wherein a strobe apparatus showing the first embodiment of the present invention is built-in so that, when the release button 18 is pushed down, the distance measurement, light measurement, exposure and film winding will be made successively and fully automatically by respective known techniques.

An active system distance measuring mechanism wherein infrared rays are radiated toward the object from an AF (auto-focus) light projecting part 12 and the reflected lights are received by an AF light receiving part 13 is adopted for the distance measuring mechanism of this strobe built-in camera so that the distances to three places within the photographed picture may be set to be measured. By the way, the three places are respectively the parts of the circular distance measuring frames 2a, 2b and 2c indicated by the broken lines in FIGS. 46 and 48 so that the distances to the three places in the major side direction of the photographed picture may be measured.

Figure 2:
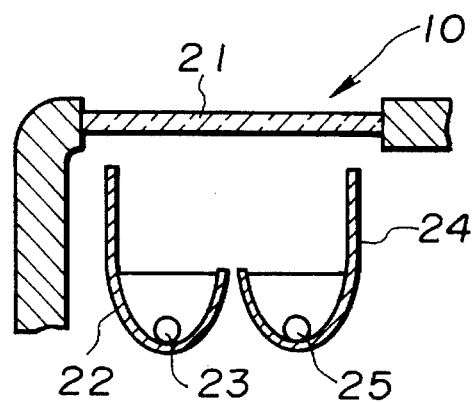
FIG. 2 is a magnified sectioned view of a strobe flashing part on line 2—2 in FIG. 1.

As the section on line 2—2 in FIG. 1 is shown in FIG. 2, a strobe flashing part 10 is formed mostly of two flashing tubes 23 and 25, two reflecting shades 22 and 24 and a strobe flashing window 21 made of a transparent plate to cover them. The strobe flashing window 21 is a transparent plate member fixed to a camera body and exposed on the outer surface of the camera body. Within the first reflecting shade 22 and second reflecting shade 24 respectively independently secured to the immovable member of the camera body, the first flashing tube 23 and second flashing tube 25 are arranged so as to be positioned respectively on the inside bottom surfaces of the reflecting shades.

Figure 3:
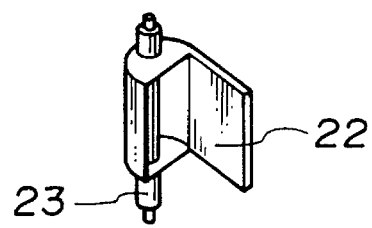
FIG. 3 is a perspective view showing a flashing tube and reflecting shade of the first flashing part in FIG. 2.
Figures 4A, 4B:
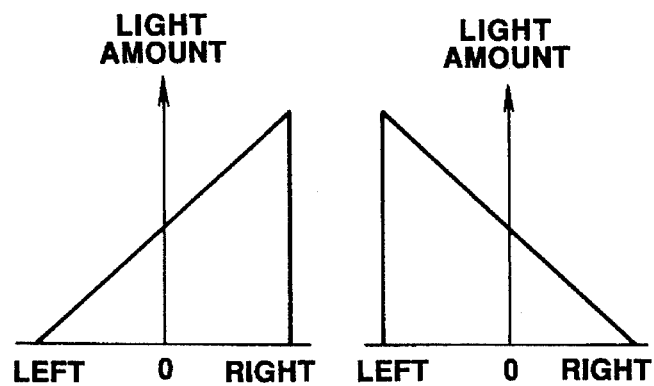
FIGS. 4A and 4B are diagrams showing the light distribution characteristics of the respective flashing tubes in FIG. 2.

As the first reflecting shade 22 on one side is shown in FIG. 3, the first and second reflecting shades 22 and 24 are so formed that the forward extending lengths may be asymmetrical. Therefore, in case the first flashing tube 23 and second flashing tube 25 having such formed reflecting shades are respectively individually flashed, the light distribution characteristics will be non-uniform patterns within the photographed picture angle as the pattern of the first flashing tube 23 is shown in FIG. 4A and that of the second flashing tube 25 is shown in FIG. 4B. As the respective light distribution characteristics are substantially symmetrical with each other with respect to the optical axis O in FIGS. 4A and 4B, in case the first and second flashing tubes 23 and 25 are flashed with the same light amount, the synthesized light distribution characteristics will be a sum of the respective light distribution characteristics and therefore uniform light distribution characteristics will be able to be made over the entire photographed picture.

By the way, in FIG. 1, the reference numeral 11 represents a photographing lens, 14 represents a finder objective window and 15 represents a displaying window for displaying the photographing state and operating state.

FIG. 5 shows in block diagram form an electric circuit of the strobe apparatus of this embodiment. A first trigger circuit 31 having a flashing trigger transformer and a first main condenser 32 for storing flashing energy are connected to the first flashing tube 23. Also, in the same manner, a second trigger circuit 33 and second main condenser 34 are connected to the second flashing tube 25.

A light amount controlling circuit 35 which is a flashing amount controlling means for controlling the flashing amounts of both flashing tubes 23 and 25 is connected to both trigger circuits 31 and 33. A comparison operating circuit 36 as a flashing amount operating means operating on the two flashing tubes 23 and 25 the flashing amounts adapted respectively to the distances to a plurality of places is connected to the above mentioned circuit 35. Further, a distance measuring part 37 as a distance measuring means for measuring the distances to a plurality of places within the photographed picture is connected to circuit 36.

Figure 46:
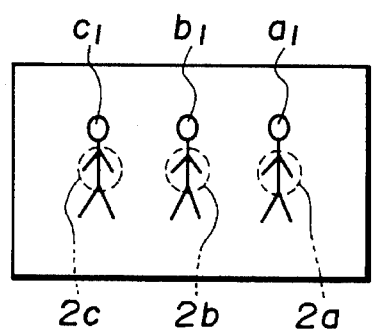
FIG. 46 is a magnified composition in photographing with a conventional strobe apparatus.
Figure 47:
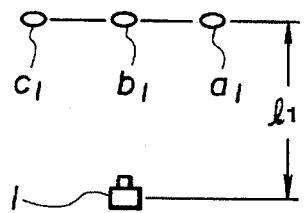
FIG. 47 is a diagram showing the distance to the objects in the composition in FIG. 46.
Figure 48:
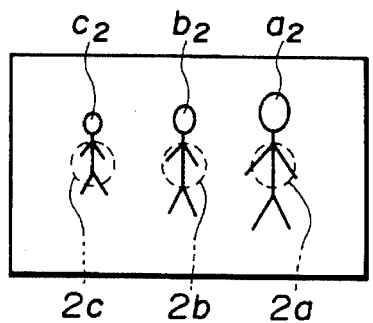
FIG. 48 is a magnified composition in photographing with a conventional strobe apparatus.

The operation of the thus formed first embodiment shall be explained in the following. When the release button 18 is pushed down, distance measuring and light measuring operations will be first made. The distance measuring operation will detect the distances to such three places as are shown in FIGS. 46 and 48 and will adopt as distance data the distance measuring data of the nearest distance object. The light measuring operation will measure the respective brightnesses of the picture center part and the entire picture and will judge to automatically flash the strobe at the time of a low luminance or backlight. Then, the operations of exposing the film surface and winding up the film will be made to complete a series of photographing operations.

Figure 49:
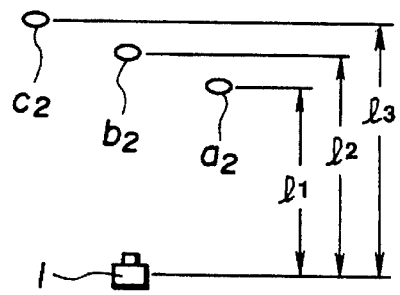
FIG. 49 is a diagram showing the distances to the objects in the composition in FIG. 48.

Now, in the case of such object distance as is shown in FIGS. 48 and 49, when the first and second flashing tubes 23 and 25 are flashed with the same light amount, the objects a1, b1 and c1 in the three places will be able to be properly exposed.

On the other hand, in the case of such object distances as are shown in FIGS. 48 and 49, in this embodiment, the distance measuring data of the object a2 positioned at the nearest distance l1 will be adopted from among the distance measuring data of the objects a2, b2 and c2 and the lens will be payed out so as to focus the distance l1. In this case, the distance measuring data of the objects b2 and c2 and the above mentioned distance measuring data will both be input into the comparison operating circuit 36.

Here, the relation between the strobe flashing amount and object distance shall be described. Generally, the light amount flashed from the strobe and reaching the object is inversely proportional to the square of the distance. Therefore, the light amount required to properly expose the objects b2 and c2 of the object distances l2 and l3 against the distance l1 of the focused object a2 can be operated.

That is to say, when the distance to the focused object a2 is represented by l1 and the distance to the object c2 is represented by l3, if the light amount radiated to the focused object a2 is represented by G1, the light amount G2 to be radiated to the object c2 will be given by $$G2 = G1 \times (l3/l1)^2.$$

Therefore, such light distribution pattern as is shown in FIG. 51 wherein, when the object a2 of the distance l1 is set to be properly exposed, the objects b2 and c2 of the distances l2 and l3 will be also able to be set to be nearly properly exposed is determined from among the light distribution patterns memorized in advance in the comparison operating circuit 36.

Such non-uniform light distribution characteristics as are shown in FIG. 51 will be obtained by respectively controlling the flashing amounts of the two flashing tubes 23 and 25. Therefore, the comparison operating circuit 36 will transmit to the light amount controlling circuit 35 the light amount ratio of both flashing parts at the time of the determined light distribution, will be operatively connected with the shutter operation, that is, the exposing operation and will transmit to the first and second trigger circuits 31 and 33 the signals corresponding to the flashing amounts of the respective flashing tubes 23 and 25 so that the first and second flashing tubes 23 and 25 may flash respectively with the predetermined light amounts and, as a result, such light distribution characteristics as are shown in the above FIG. 51 may be obtained.

Thus, according to the first embodiment, when the photographer pushes down the release button only, a photograph in which the other objects than the focused object will be also nearly properly exposed will be able to be obtained. By the way, in the above mentioned first embodiment, an AF apparatus of measuring the distances of three points is exemplified but the distance measuring points are not limited to three points and it is needless to say that, if the distances of more points are measured, light distribution characteristics based on the more accurate information will be able to be determined.

Also, in The above mentioned embodiment, the determination of such light distribution characteristics as nearly properly expose the objects b2 and c2 of the distances l2 and l3 against the focused object a2 of the distance l1 is exemplified but in the actual photographing, the distances will not always be $$l1 < l2 < l3.$$

Therefore, the case that the respective distances of the three objects a2, b2 and c2 shown in FIG. 48 are, for example, $$l1 < l2 > l3$$

and $$l1 < l3$$

shall be considered in the following as a modification of this embodiment in this modification, it is the same as in the above mentioned first embodiment that the focused object is the object a2 positioned at the nearest distance l1 but, as at least another object (mentioned as the second object hereinafter) to be properly exposed than the focused object, the object, that is, the object c2 of the distance measured value nearest on the far distance side to the distance measured value of the focused object is selected instead of the object b2 positioned at the above mentioned farthest distance l2.

That is to say, in case the distance to the first object is l1 and the distance to the above mentioned second object is l2, $G1 \times (l2/l1)^2$ will be operated by using the light amount G1 radiated to the first object and, at the time of the exposure, the above mentioned light amount G1 will be radiated to the first object and the light amount of $G1 \times (l2/l1)^2$ will be radiated to the second object.

Also, in case the focused distance in the above mentioned FIGS. 48 and 49 is l2, that is, in case the focused object is the object b2 in the center of the picture and l2<l1, l2<l3 and l1≈l3, l1 and l3 will not be able to be both properly exposed and therefore both flashing parts will be flashed with the same light amount to obtain uniform light distribution characteristics.

In FIGS. 48 and 49, in case the distance difference from the focused distance l1 is so large as to satisfy l2/l1>4 and l3/l1>4, the difference between the object distances will be so large that it will not be able to desire to determine such light distribution pattern as will make the exposure of all the objects proper and therefore the same light amount as to the focused object will be radiated to the entire region within the photographed picture angle.

Figure 6:
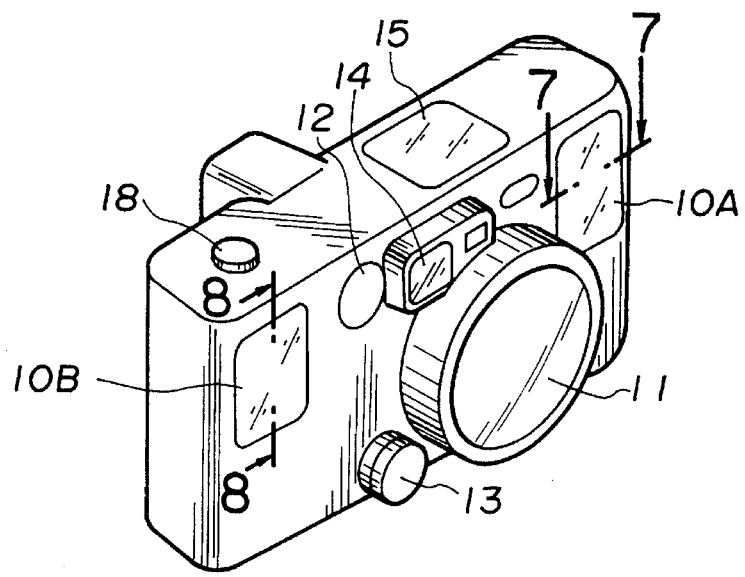

FIG. 6 is a perspective view of a camera in which a strobe apparatus showing the second embodiment of the present invention is built-in. It is the same as the first embodiment in that it is a camera of a type wherein, when the release button is pushed down, the respective operations of measuring the distance, measuring the light, exposing to the light and winding up the film will be fully automatically made but this second embodiment is different in respect that a left side strobe flashing part 10A and a right side strobe flashing part 10B are arranged respectively on opposite sides of the photographing lens 11.

That is to say, the first embodiment has been on the light distribution characteristics in the case of taking a photograph in which such plurality of objects as are shown in FIGS. 46 and 48 are arranged in the horizontal direction but, in the actual photographing, there may be a case of photographing a vertically long picture with the camera kept vertical.

Figure 12:
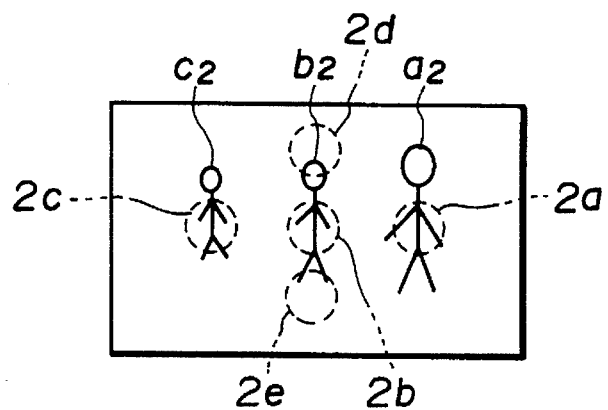
FIG. 12 is a photographing composition when a camera having a strobe apparatus of the second embodiment is set in a horizontal position.
Figure 14:
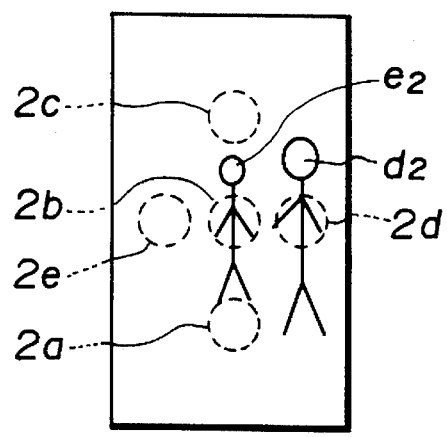
FIG. 14 is a photographing composition when a camera having a strobe apparatus of the second embodiment is set in a vertical position.

Therefore, in this second embodiment, a proper exposure will be given to each object even in the case of photographing such vertically long picture as is shown in FIG. 14 in addition to such horizontally long ordinary photographed picture as is shown in FIG. 12.

Ordinary objects are figures and trees and therefore, even if the distances to many points of them in the vertical direction are measured, there will be no significance. Therefore, usually the distance measuring points are set in the horizontal direction as in the above mentioned first embodiment. However, when the camera is changed to be in the vertical position from the horizontal position, the distances to the three points in the vertical direction will be measured. Therefore, in this second embodiment, when the camera is changed to be in the vertical position from the horizontal position, the distance measuring direction will be also changed. By the way, among the component members in this second embodiment, the same component members as in the above mentioned first embodiment shall bear the same reference numerals and shall not be explained here but only the different component members shall be explained. The same can be said also on the respective embodiments shown in the following.

Figure 7:
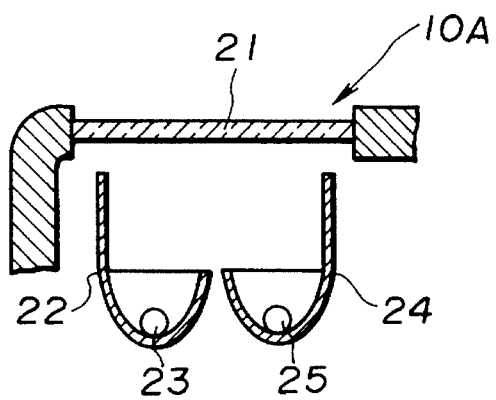
FIG. 7 is a magnified sectioned view of a strobe flashing part on line 7—7 in FIG. 6.

Returning to FIG. 6, two flashing tubes are arranged respectively within the left side strobe flashing part 10A and the right side strobe flashing part 10B when the camera is directed to the object. As the section on line 7—7 in FIG. 6 is shown in FIG. 7, the left side strobe flashing part 10A is formed the same as in FIG. 2 in the above mentioned first embodiment and is arranged so that the center axes of the first and second flashing tubes 23 and 25 may coincide with the vertical direction of the camera. On the other hand, as the section on line 8—8 in FIG. 6 is shown in FIG. 8, in the right side strobe flashing part 10B, a third reflecting shade 42 and fourth reflecting shade 44 which are the same as or somewhat narrower in the light distribution characteristics than the first reflecting shade 22 and second reflecting shade 24 in the above mentioned left side strobe flashing part 10A are respectively fixed to an immovable member within a strobe flashing window 41 and are arranged so that the center axes of the flashing tubes may coincide with the horizontal direction of the camera. A third flashing tube 43 and fourth flashing tube 45 are arranged so as to be positioned respectively on the inner bottom surfaces of the reflecting shades.

Thus, this embodiment has four flashing tubes 23, 25, 43 and 45. As shown in FIGS. 9A and 9B by the respective flashing tubes 23 and 25 of the left side strobe flashing part 10A, the light distribution characteristics with each flashing tube alone are non-uniform in the horizontal direction of the photographed picture (horizontal direction of the camera) and, as shown in FIGS. 10A and 10B by the respective flashing tubes 43 and 45 of the right side strobe flashing part 10B, they are non-uniform in the vertical direction of the photographed picture (vertical direction of the camera).

The light distribution characteristics shown in FIGS. 9A and 9B and the light distribution characteristics shown in FIGS. 10A and 10B are respectively symmetrical with each other with respect to the center of the photographed picture. When the first and second flashing tubes 23 and 25 are flashed with the same light amount and when the third and fourth flashing tubes 43 and 45 are flashed with the same light amount, uniform light distribution characteristics will be able to be obtained on the entire picture. That is to say, two kinds of strobe flashing parts are provided so that the variable directions of the radiated light amount of the strobe apparatus may intersect substantially at right angles with each other and, at the time of the exposure, either of the strobe flashing parts will be operated.

In this camera, as the distance measuring state within the finder is shown in FIG. 12, the distance measuring frames 2a to 2e consisting of five circular frames shown by broken lines are distance measuring points. That is to say, against the three-point distance measuring system of the above mentioned first embodiment, in this second embodiment, the distance can be measured also above and below the center part, that is, the distance can be measured in at least five points so that the major side direction and minor side direction of the picture may intersect at right angles with each other within the photographed picture angle.

Figure 11:
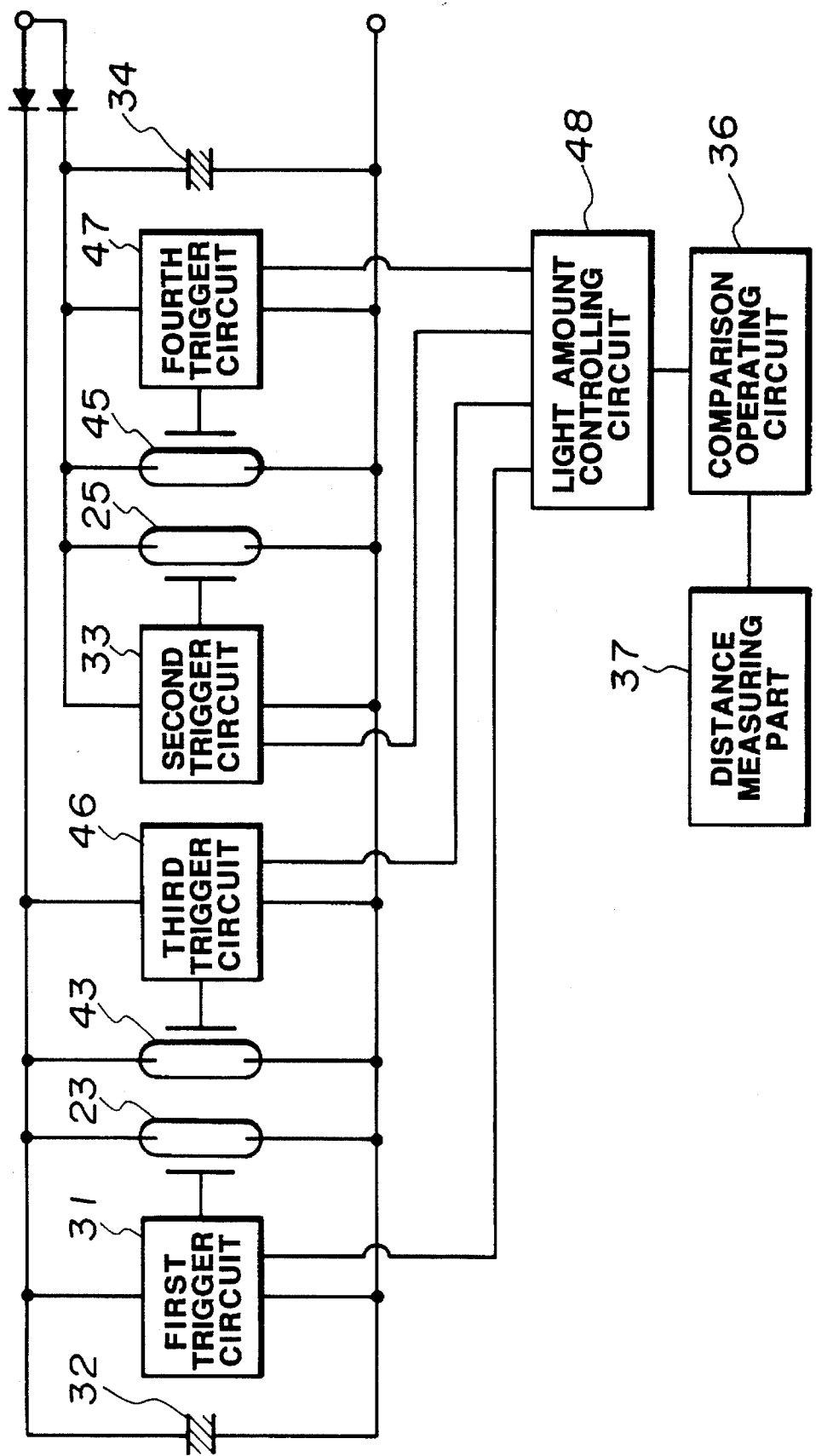
FIG. 11 is a block diagram showing the formation of an electric circuit of the strobe apparatus of the second embodiment.

FIG. 11 shows the circuit formation of the second embodiment. The first to fourth flashing tubes 23, 25, 43 and 45 are provided respectively with the first to fourth trigger circuits 31, 33, 46 and 47. Of flashing energy storing main condensers, the first main condenser 32 is connected to the first flashing tube 23 and third flashing tube 43 and the second main condenser 34 is connected to the second flashing tube 25 and fourth flashing tube 45. The first to fourth trigger circuits 31, 33, 46 and 47 are respectively controlled by a light amount controlling circuit 48 to which a comparison operating circuit 36 is connected. A distance measuring part 37 is further connected to circuit 36.

Figure 13:
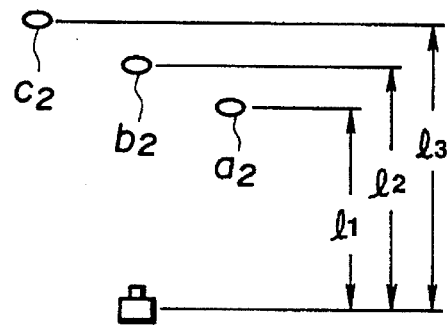
FIG. 13 is a diagram showing the distances to the respective objects in FIG. 12.

The operation of the thus formed second embodiment shall be explained in the following. Of the five distance measurable points, usually the distance is measured in the three points in the major side direction of the picture and the nearest object distance is made focused data. In the case of such composition as is shown in FIG. 12, from the distance measuring data of such distances l1, l2 and l3 as are shown in FIG. 13, the same as in the above mentioned first embodiment, an operation for bringing the respective objects near to a proper exposure is made.

However, in case the camera is held in the vertical position as shown in FIG. 14 and the objects d2 and e2 are to be photographed, no accurate picture information will be obtained in the distance measuring positions of the distance measuring frames 2a, 2b and 2c. Therefore, in the case of photographing in this vertical position, the distance measuring position will be automatically switched to 2d, 2b and 2e by the operation of a switch (not illustrated) detecting the vertical position and horizontal position of the camera. This detecting switch is formed of a switch utilizing gravity. The means of detecting the vertical position and horizontal position of the camera is not specifically limited to the above mentioned switch. When the release is operated with the composition shown in FIG. 14, the distance information of the objects within the distance measuring frames 2d, 2b and 2e will be determined in the distance measuring part 37 shown in FIG. 11 and will be input into the comparison operating circuit 36 which will first determine as focused data the data of measuring in the distance measuring frame 2d the distance of the object positioned on the nearest distance side, that is, the value of measuring the distance of the object of the distance l1.

Figure 15:
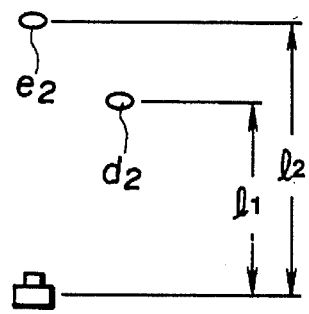
FIG. 15 is a diagram showing the distances to the respective objects in FIG. 14.

Then, the light distribution characteristics are to be determined. In FIG. 14, as there is no object within the distance measuring frame 2e and substantially nearly infinite distance measuring data are obtained, the light distribution characteristics will be determined with only the data of the distance l2 against such distance measuring data of the distance l1 as are shown in FIG. 15.

As the thus determined light distribution characteristics will be of a type varying in the minor side direction of the picture, necessary light distribution characteristics will be obtained by properly varying the light amounts of the third and fourth flashing tubes 43 and 45 by using the right side strobe flashing part 10B having non-uniform light distribution characteristics in the vertical direction as shown in FIGS. 10A and 10B. Then, the comparison operating circuit 36 will transmit to the light amount controlling circuit 48 the flashing ratio of the third and fourth flashing tubes 43 and 45. Then, the light amount controlling circuit 48 will deliver signals to the third and fourth trigger circuits 46 and 47 in conformity with the actual timing of the shutter and will control the respective flashing light amounts. By the above, the light distribution characteristics optimum to the photographing in FIG. 14 will be able to be obtained as a total light amount.

It is needless to say that, in the case of such horizontal position (ordinary position), the light amount controlling circuit 48 will deliver trigger signals to the first and second trigger circuits 31 and 33 to obtain the necessary light distribution characteristics.

According to this second embodiment, a flashing part which can distribute lights in the major side direction of the photographed picture and a flashing part which can distribute lights in the minor side direction are provided, further the distances in both major side direction and minor side direction of the picture can be measured and therefore, in either vertical or horizontal composition, proper light distribution characteristics can be always obtained. By the way, in this second embodiment, the system of automatically switching the distance measuring position with a switch detecting the vertical position and horizontal position of the camera is used but the automatic switching is not particularly necessary to reflect the intention of the photographer and a system of switching the distance measuring position with an externally operating member may well be used.

A strobe apparatus showing the third embodiment of the present invention shall be explained in the following with reference to FIGS. 16 to 20. In the above mentioned respective embodiments, the present invention is applied to a camera in which the photographed picture angle is fixed. In this third embodiment, the present invention is applied to a camera using a zoom lens so that, as operatively connected with the zooming operation, the strobe apparatus may also vary in the light distribution characteristics.

Figure 16:
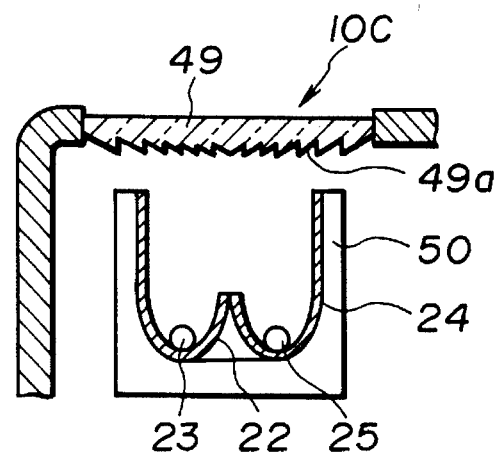
Figure 17:
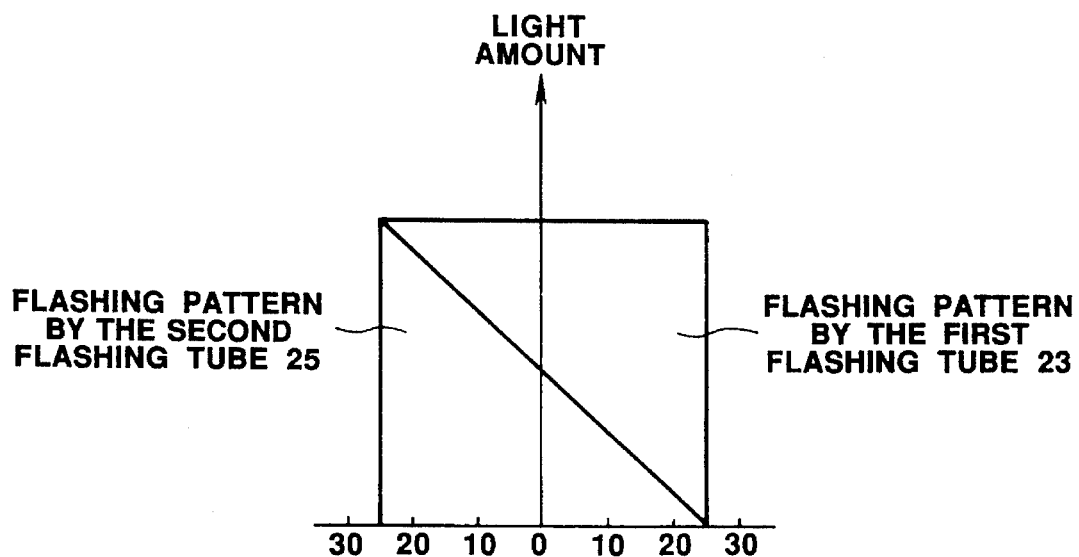
FIG. 17 is a diagram showing the light distribution characteristics of the respective flashing tubes in the strobe flashing part in FIG. 16.

FIG. 16 is a cross-sectioned view of an essential part of a strobe flashing part 10C arranged in the same position as of the strobe flashing part 10 of the camera in FIG. 1. A strobe flashing window 49 made of a transparent plate is formed of a convex lens in which a Fresnel lens 49a is formed on the inner surface. The first reflecting shade 22 and second reflecting shade 24 have the first and second flashing tubes 23 and 25 respectively on the inner bottom surfaces and are fitted to a strobe stand 50 set to be movable in the optical axis direction as operatively connected with the zooming operation of the photographing lens by an operatively connecting member not illustrated. FIG. 16 shows the strobe flashing part in the wide photographing state of the camera. As shown in FIG. 17, the light distribution characteristics in this wide photographing state show that, when the first and second flashing tubes 23 and 25 are flashed with the same light amount, uniform light distribution characteristics will be obtained in a range of about 25 degrees on one side.

Figure 18:
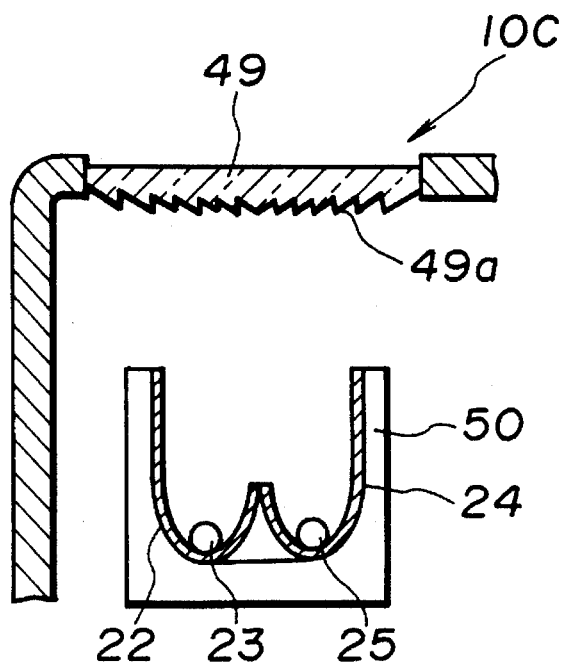

FIG. 18 shows the state of the strobe flashing part when the photographing lens is in the tele photographing state. The strobe stand 50 will move in the optical axis direction as operatively connected with the zoom movement of the lens to the tele position and the distances of the first and second flashing tubes 23 and 25 from the strobe flashing window 49 will increase. Therefore, if the flashing amounts of these first and second flashing tubes 23 and 25 are the same, the light distribution characteristics in this tele state will be a uniform light distribution pattern in a range of about 15 degrees on one side as shown in FIG. 19.

Figure 20:
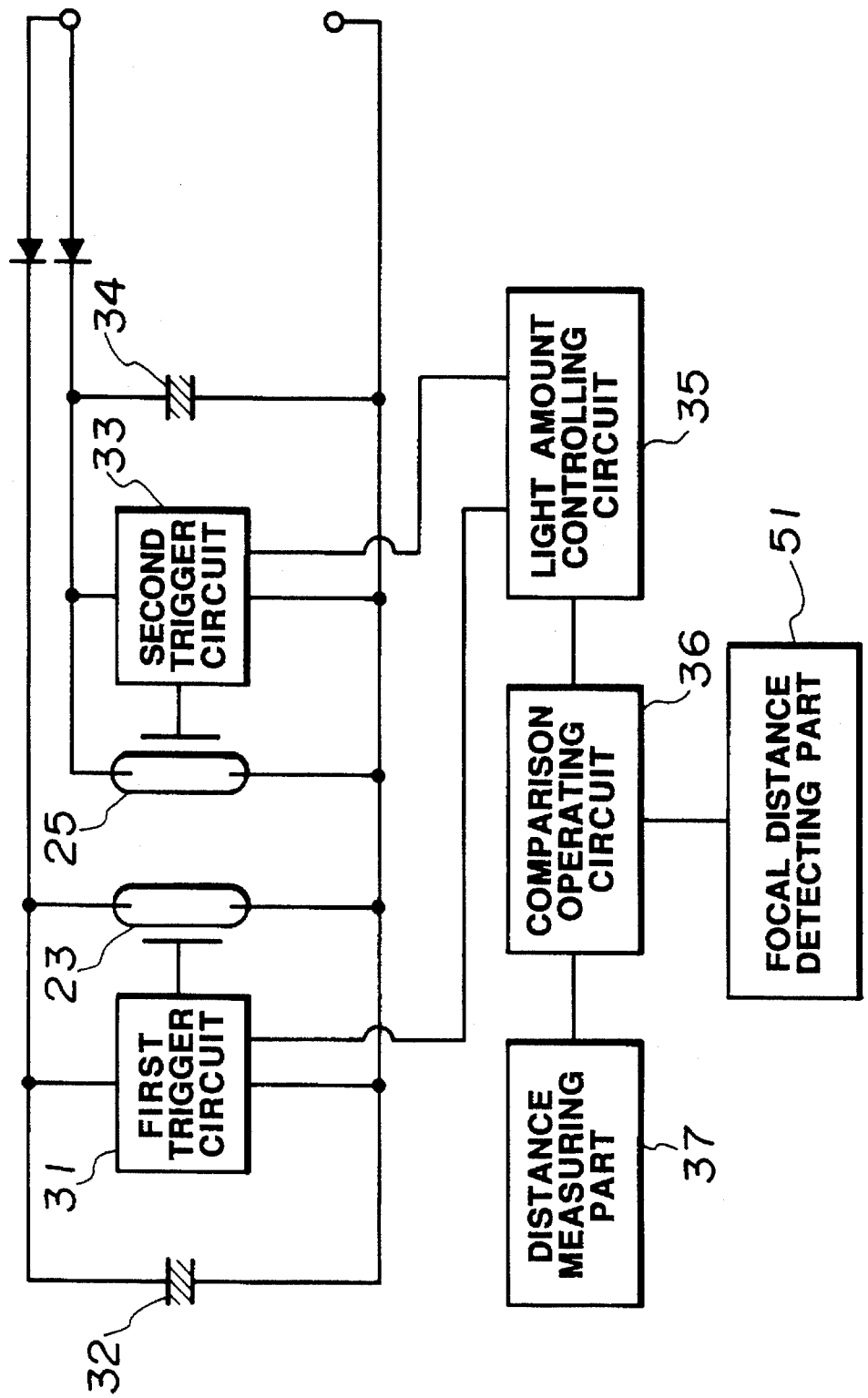
FIG. 20 is a block diagram showing the formation of an electric circuit of the strobe apparatus of the third embodiment.

The distance measuring part in this third embodiment is of the three-point distance measurement of the TTL (through the taking lens) system using the photographing lens and, even if the focal distance varies, the distance measuring position within the photographed picture angle will be fixed. FIG. 20 shows the circuit formation of the third embodiment which is different only in the respect that a focal distance detecting part 51 is added to the circuit of the above mentioned first embodiment.

Figure 19:
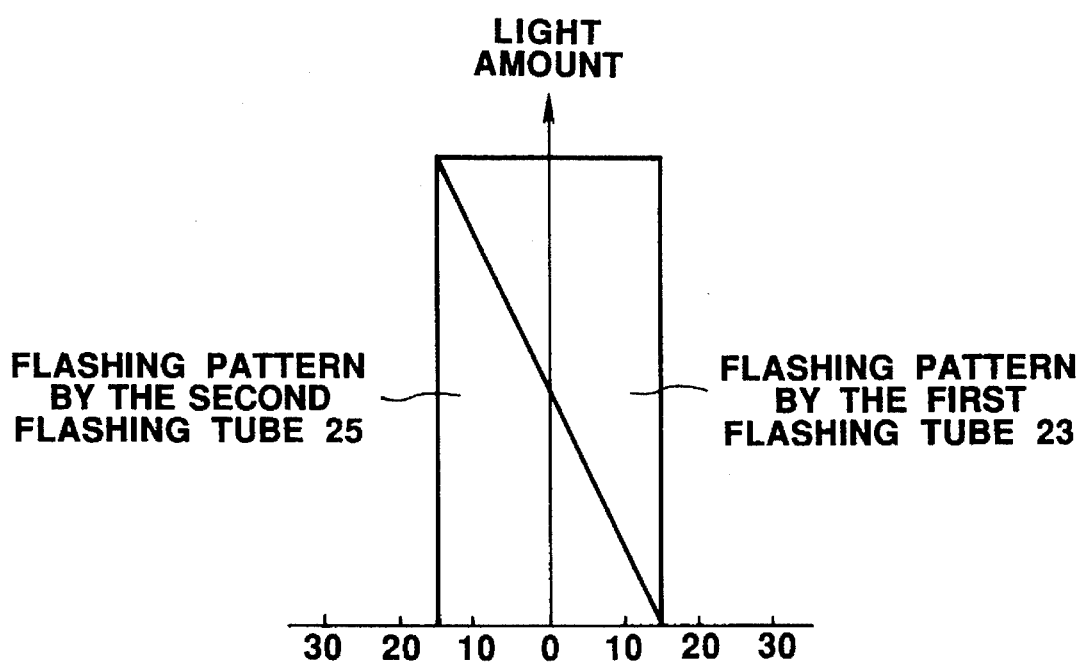
FIG. 19 is a diagram showing the light distribution characteristics of the respective flashing tubes in the strobe flashing part in FIG. 18.

In the thus formed third embodiment, any picture angle can be selected by the zooming in the case of the photographing but, as it is not different that, at any picture angle, as the wide and tele light distribution patterns are shown in FIGS. 17 and 19, if the flashing amounts of the first and second flashing tubes 23 and 25 are the same, uniform light distribution characteristics will be obtained, if the distances are measured by the release operation and the determined three-point distance measuring data are operated the same as in the above mentioned first embodiment, light distribution patterns adapted to the respective objects will be able to be obtained.

In this case, the distance measuring information and the focal distance information detected by the focal distance detecting part 51 will be input into the comparison operating circuit 36 in FIG. 20. In the comparison operating circuit 36, the variations of the light distribution characteristics in the respective focal distances are memorized so that the optimum light distribution and exposure may be determined from these data and distance measuring data. Then, in the same manner as in the above mentioned first embodiment, the first and second flashing tubes 23 and 25 will be controlled in the light amounts so that the optimum photographing may be possible. According to this third embodiment, the present invention can be more effectively applied also to the zoom strobe.

The fourth and fifth embodiments of the present invention shall be explained in the following. This embodiment is not to control the flashing amount by measuring the distance to the object as in the above mentioned respective embodiments but is to control the flashing by selecting the displayed image scene or the like. That is to say, this light distribution variable strobe apparatus is provided with at least two flashing parts which can independently control the flashing amounts and are set to obtain non-uniform light distribution characteristics substantially symmetrical with respect to the center axis within the photographed picture angle.

Figure 26:
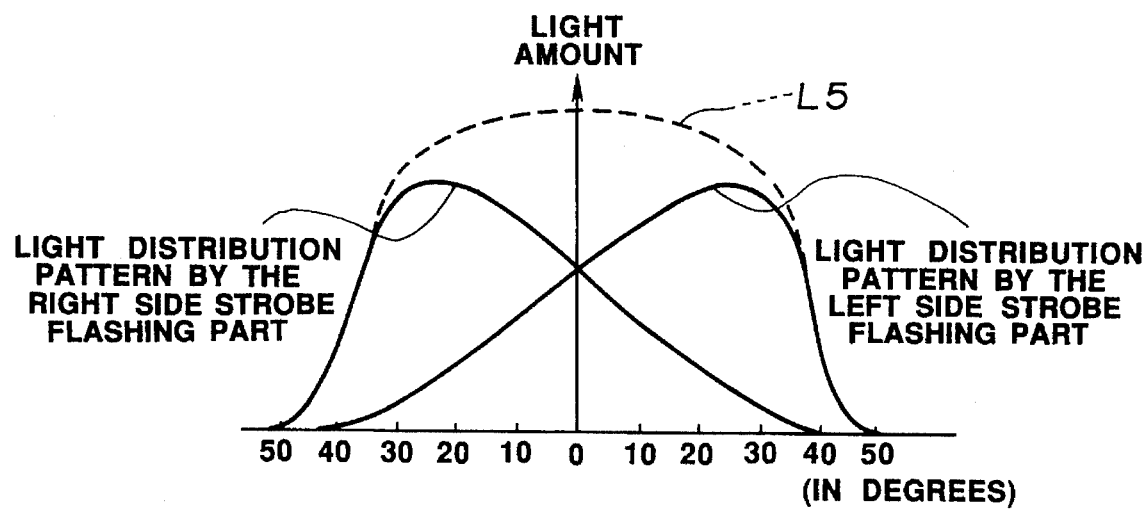
FIG. 26 is a diagram showing actual light distribution characteristics in the strobe apparatus of the fourth embodiment.

It shall be detailed with reference to FIGS. 25A and 25B to 29. As shown in FIGS. 25A and 25B, the light distribution characteristics with the respective strobe flashing parts alone are set to be of the substantially maximum light amount at one end of the photographed picture angle and the minimum light amount at the other end and to be linearly symmetrical with respect to the lens optical axis, that is, at 0 degree in the diagram. By the way, these light distribution patterns are shown to be triangular for convenience sake in the explanation but will be in fact as shown in FIG. 26.

Figure 27:
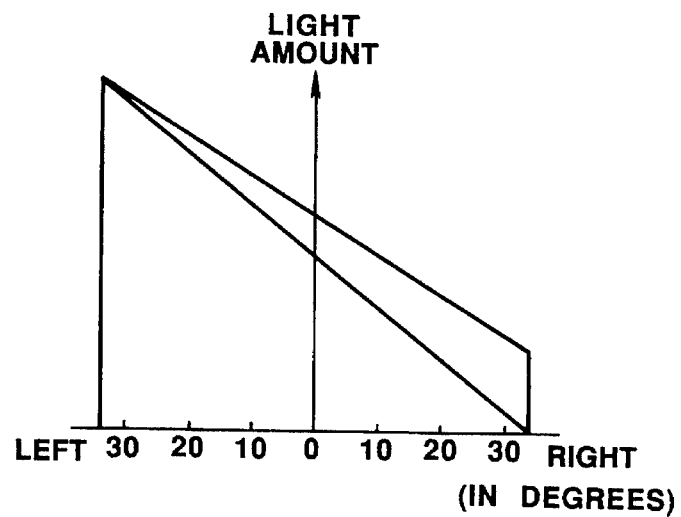
FIG. 27 is a diagram showing a light distribution pattern of the flashing amounts of both strobe flashing parts when the second (right side) flashing tube is emphasized.
Figure 28:
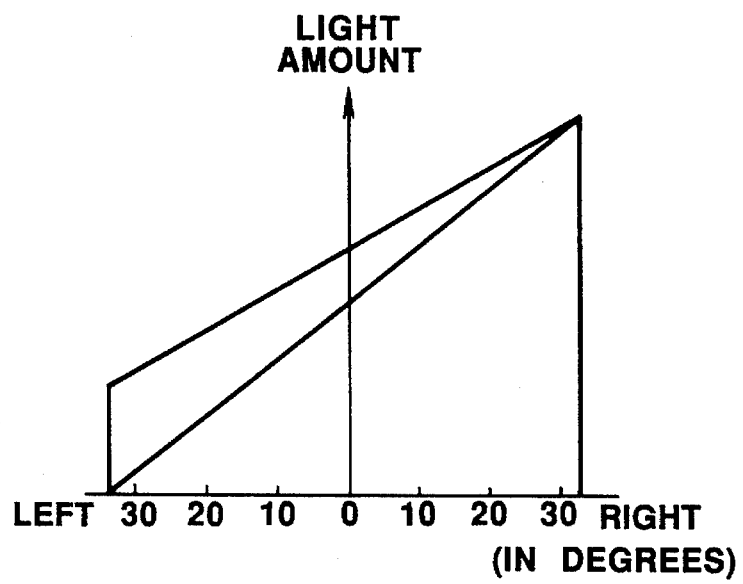
FIG. 28 is a diagram showing a light distribution pattern of the flashing amounts of both strobe flashing parts when the first (left side) flashing tube is emphasized.

The case of varying the light distribution characteristics shall be explained with reference to FIGS. 27 and 28. As the respective strobe flashing parts have non-uniform light distribution characteristics as described above, if the flashing amounts of both strobes are properly controlled, such light distribution pattern emphasized on the left side as is shown in FIG. 27 and such light distribution pattern emphasized on the right side as is shown in FIG. 28 will be able to be obtained. The emphasizing degrees on the right and left in the above mentioned light distribution patterns can be steplessly set by steplessly controlling the flashing amount ratio.

Figure 29:
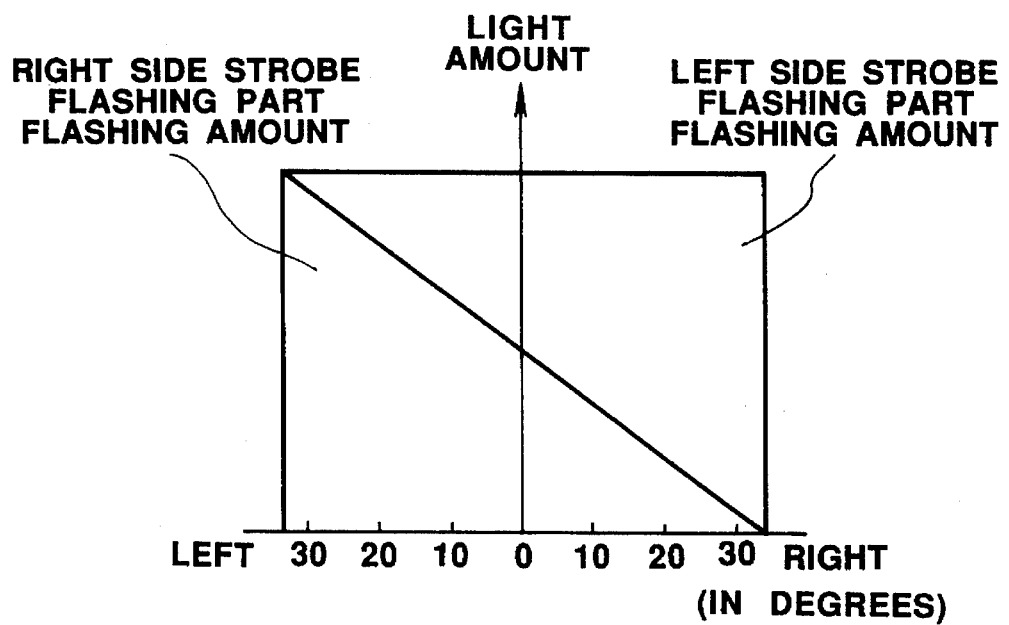
FIG. 29 is a diagram showing a total light amount when the respective flashing tubes are flashed with the maximum light amounts.

By the above, it is possible to simply obtain a light distribution pattern adapted to the object. Further, if the respective strobes are flashed respectively with the maximum light amounts, the total light amount and light distribution will be as shown in FIG. 29.

Thus, the present invention can be applied to either a camera with a strobe built-in or a camera externally fitted with a strobe apparatus. In the following embodiment, the present invention as applied to a camera with a strobe built-in shall be explained.

Figure 21:
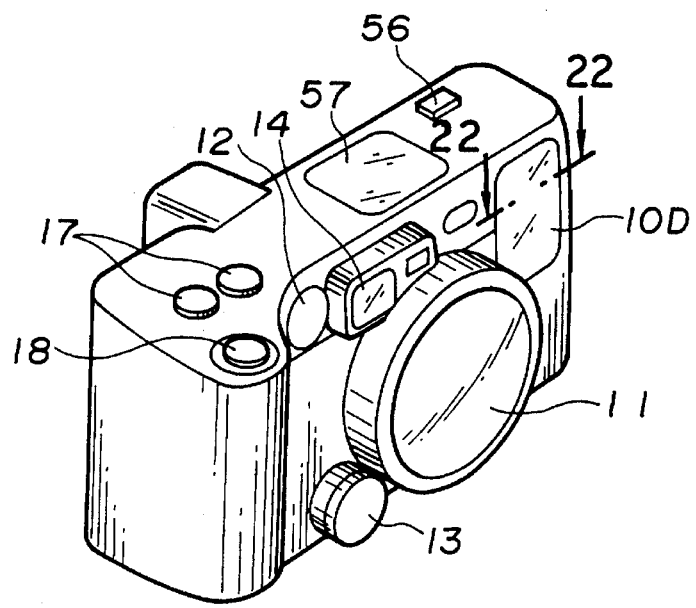

FIG. 21 is a perspective view of a camera in which a light distribution variable strobe apparatus showing the fourth embodiment of the present invention is built-in. This camera is a zoom camera in which, the same as in the above mentioned cameras, when the release button 18 is pushed down, the distance measuring, light measuring, exposing and film winding up operations will be successively and fully automatically made by known techniques.

Figure 22:
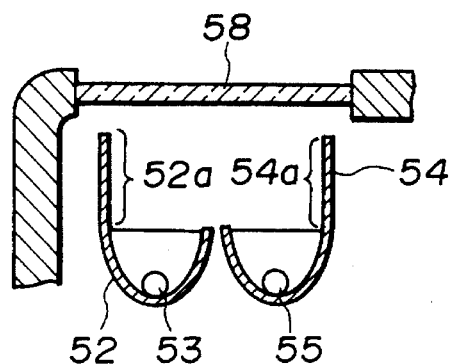
FIG. 22 is a magnified sectioned view of a strobe flashing part on line 32—22 in FIG. 21.
Figure 23:
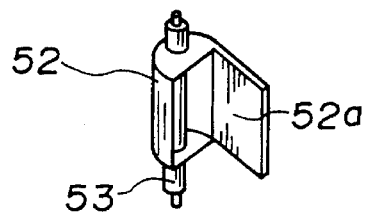
FIG. 23 is a perspective view showing a flashing tube and reflecting shade of the first flashing part in FIG. 22.

The strobe flashing part 10D has two sets of flashing parts. A magnified sectioned view as seen in the arrow 22—22 direction is shown in FIG. 22. A perspective view of one flashing part is shown in FIG. 23. In FIGS. 22 and 23, within a strobe flashing window 58 are parallelly provided a first flashing part consisting of first reflecting shade 52 and a first flashing tube 53 and a second flashing part consisting of a second reflecting shade 54 and a second flashing tube 55 which are in a relation of substantially inverting the first ones. In the shapes of the first and second reflecting shades 52 and 54, plane parts 52a and 54a of about the same length as the depth of the shade are respectively integrally provided at the respective outer ends of the shades of a semi-elliptical cross-sectioned shape and, as the positions of these plane parts 52a and 54a are linearly symmetrical with each other, such light distribution pattern as is shown in FIG. 26 will be obtained. This light distribution pattern is conceptionally represented to be as shown respectively in FIGS. 24A and 24B. They are substantially symmetrical with each other with respect to the photographing optical axis and are non-uniform in the lengthwise direction of the photographed picture. By the way, it is needless to say that the first and second reflecting shades 52 and 54 and the first and second flashing tubes 53 and 55 are supported by members not illustrated.

Figure 34:
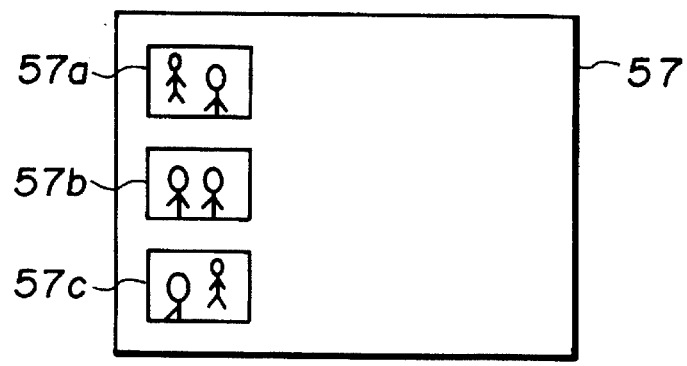
FIG. 34 is a plan view showing image scenes displayed in a displaying part of the camera shown in FIG. 21.

Returning to FIG. 21, the reference numeral 11 represents a photographing lens, 12 and 13 represent respectively a distance measuring light projecting part for AF and a distance measuring light receiving part for AF, 14 represents a finder objective window and 17 represents zoom buttons for zooming. The reference numeral 57 represents a displaying part for displaying a light distribution pattern explained in the later described FIG. 34 so that, when a switching part 56 is pushed down, image scenes 57a, 57b and 57c (See FIG. 34) may be successively switched.

Figure 30:
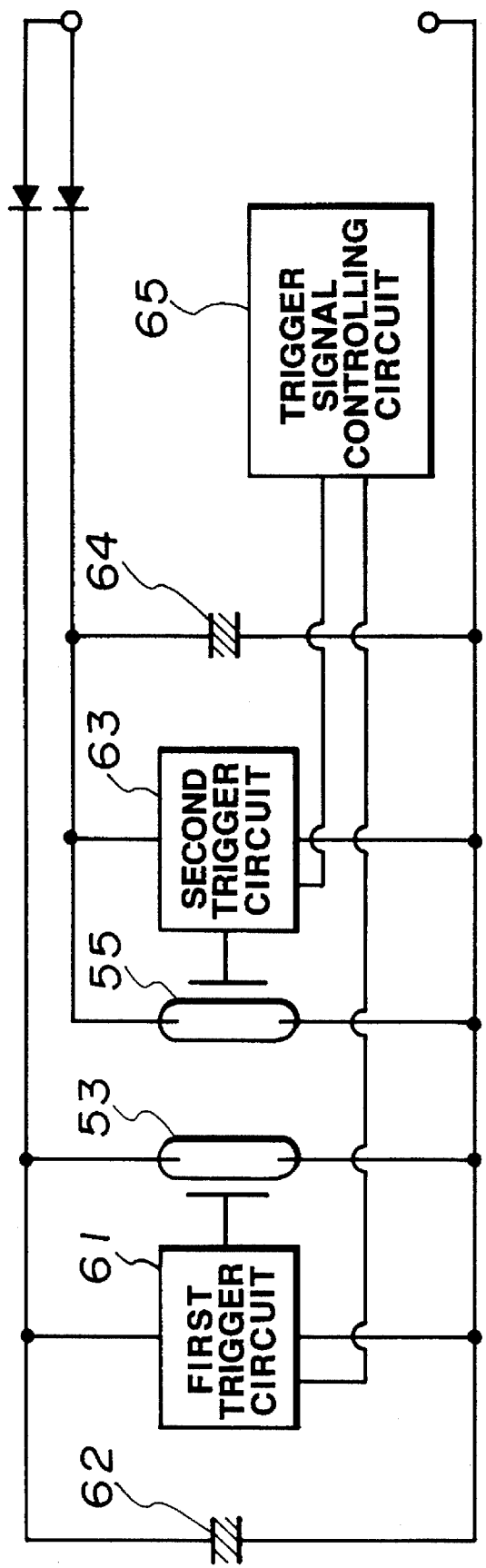
FIG. 30 is a block diagram showing the formation of an electric circuit of the strobe apparatus of the fourth embodiment.

FIG. 30 is a block diagram showing an electric circuit of this embodiment. To a first flashing tube 53 are connected a first trigger circuit 61 having a flashing trigger transformer and a first main condenser 62 for storing a flashing energy. In the same manner, to a second flashing tube 55 are connected in the same manner a second trigger circuit 63 having a flashing trigger transformer and a second main condenser 64 for storing a flashing energy. To both trigger circuits 61 and 63 is connected a trigger signal controlling circuit 65 controlling the flashing amounts of both flashing tubes 53 and 55 so that the light amount ratio of both flashing tubes 53 and 55 may be controlled by this controlling circuit 65.

Figure 31A:
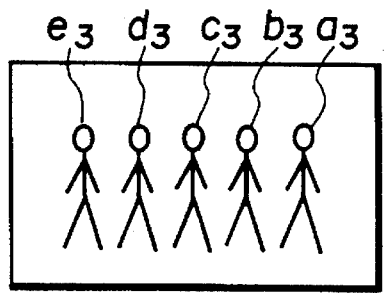
FIGS. 31A and 31B are diagrams respectively showing a photographing composition of a plurality of objects at the same distance and the distance to the objects.
Figure 31B:
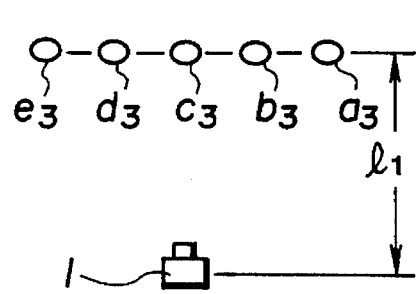
Figure 32A:
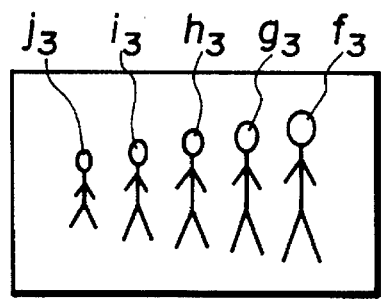
FIGS. 32A and 32B are diagrams respectively showing a photographing composition of a plurality of objects at different distances and the distances to the objects.
Figure 32B:
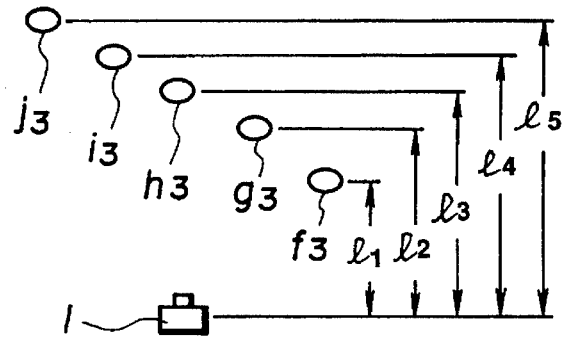
Figure 33A:
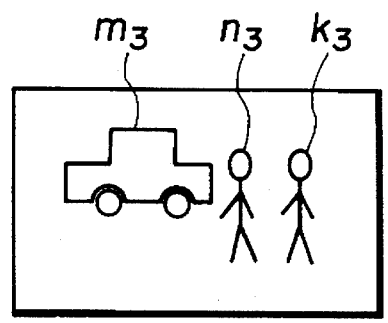
FIGS. 33A and 33B are diagrams respectively showing a photographing composition of a plurality of objects at different distances and the distances to the objects.
Figure 33B:
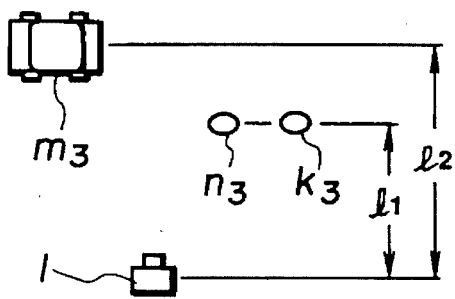

The operation of the thus formed fourth embodiment shall be explained. If the switching part 56 is not pushed down, the embodiment will operate with a standard light distribution pattern. That is to say, in case such plurality of objects a3, b3 . . . and e3 as are shown in FIGS. 31A and 31B are at substantially the same distance l1 from the camera 1, when the release button 18 (See FIG. 21) is only pushed down, an entirely properly exposed photograph will be obtained. However, with such objects f3, g3 . . . and j3 at successively different distances l1, l2 . . . and l5 as are shown in FIGS. 32A and 32B and such background m3 at a distance l2 and figures k3 and n3 at a distance l1 as are shown in FIGS. 33A and 33B, usually only the focused object will be properly exposed.

In order to avoid it, three kinds of light distribution patterns are provided in this embodiment. That is to say, in case the photographer is to photograph such scenes as are shown in FIGS. 32A, 32B, 33A and 33B, when the switching part 56 in FIG. 21 is pushed down, the image scene 57a or 57c will be able to be selected on the displaying part 57 shown in FIGS. 21 and 34.

When the image scene 57a is selected, the trigger signal controlling circuit 65 in FIG. 30 will control the flash at a predetermined flashing ratio. That is to say, when the release button is pushed down, the second flashing tube 55 will flash with a substantially full light amount and the first flashing tube 53 will flash with a fraction of that light amount so that such light distribution pattern as is shown in FIG. 27 will be obtained as a total of both flashing tubes 53 and 55. In the same manner, when the image scenes 57c and 57b are selected, such light distribution patterns as are shown in FIGS. 28 and 29 will be respectively obtained. Thus, at least three kinds of the combination of the light amounts of the respective flashing parts can be selected by the switching part 56 which is an operating member.

According to this fourth embodiment, by only selecting the light distribution mode adapted to the object, a background and a plurality of figures at different distances can be strobo-photographed with a nearly proper exposure.

An application of the fourth embodiment shall be explained in the following with reference to FIGS. 35 to 38. The above mentioned embodiment has been described in the case that the photographed picture angle is fixed but, in this application, the light distribution characteristics of the strobe apparatus vary as operatively connected with the zooming operation and the flashing amounts of the first and second flashing parts are respectively independently controlled so that, even in case a plurality of main objects are at different distances within the picture angle, the optimum light distribution pattern will be able to be obtained. Also, in this application, the same component members as in the above mentioned fourth embodiment shall bear the same reference numerals and shall not be explained here.

Figure 35:
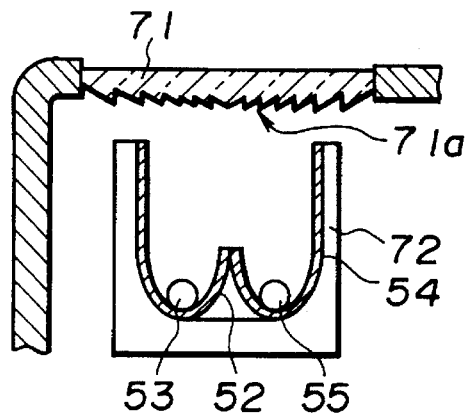
FIG. 35 is a magnified sectioned view of an essential part of a strobe flashing part in a wide position in an application of the strobe apparatus of the fourth embodiment.
Figure 37:
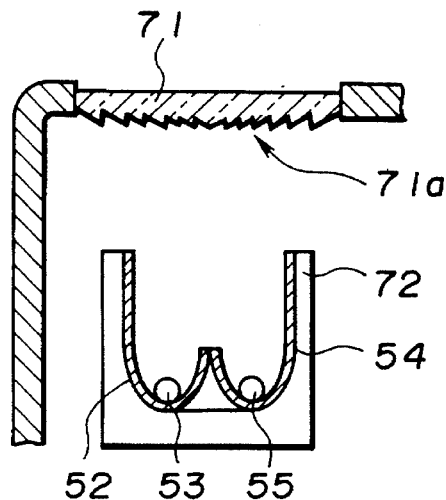
FIG. 37 is a magnified sectioned view of an essential part of a strobe flashing part in a tele position in an application of the strobe apparatus of the fourth embodiment.

Generally, in order to vary the light distribution pattern of the strobe with the variation of the focal distance of the photographing lens, the distance between the strobe flashing part and the lens arranged in front of this flashing part is relatively varied. In this application, with respect to a strobe flashing window 71 in which a Fresnel lens 71a is formed on the back side, the flashing part is moved in conformity with the movement of the photographing lens by an operatively connected member not illustrated. FIG. 35 shows a wide photographing state and FIG. 37 shows a tele photographing state.

In this application, a first reflecting shade 52 and first flashing tube 53 forming a first flashing part and a second reflecting shade 54 and second flashing tube 55 forming a second flashing part are respectively independently fixed to a strobe stand 72. The trigger circuit shown in FIG. 30 is connected to the first and second flashing tubes 53 and 55.

Figure 36:
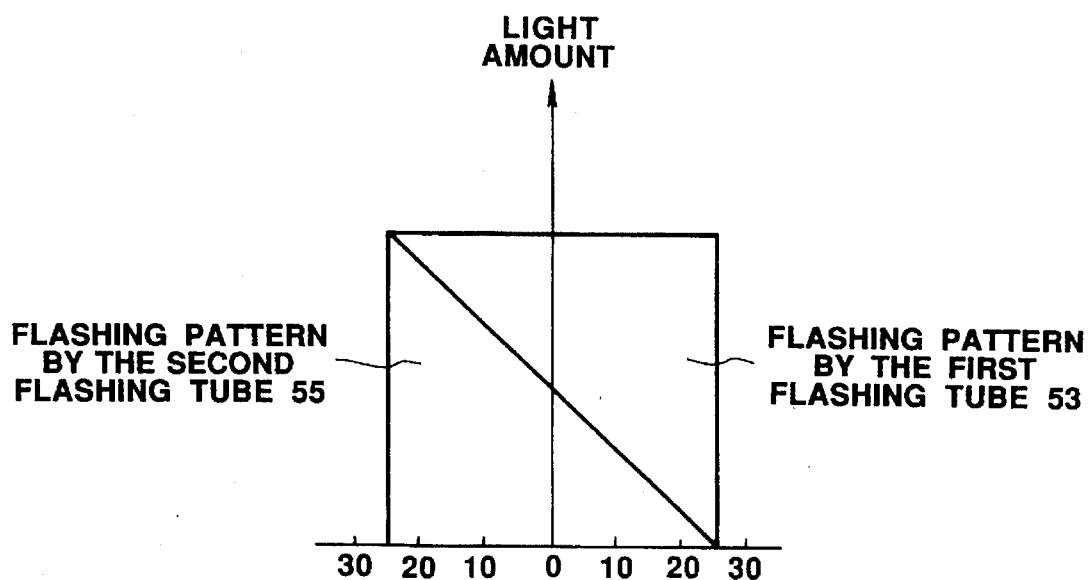
FIG. 36 is a diagram showing the light distribution characteristics in the strobe flashing part in FIG. 35.

In the thus formed above mentioned application, when both flashing tubes 53 and 55 are fully flashed with the camera in the wide state shown in FIG. 35, a uniform light distribution pattern shown in FIG. 36 will be obtained. It is the same as in the fourth embodiment that, as shown also in FIG. 36, the respective flashing tubes 53 and 55 have light distribution characteristics substantially symmetrical with respect to the optical axis. Therefore, if the flashing energy of one flashing tube is controlled in this state, a non-uniform light distribution corresponding to a wide picture angle will be able to be obtained.

Figure 38:
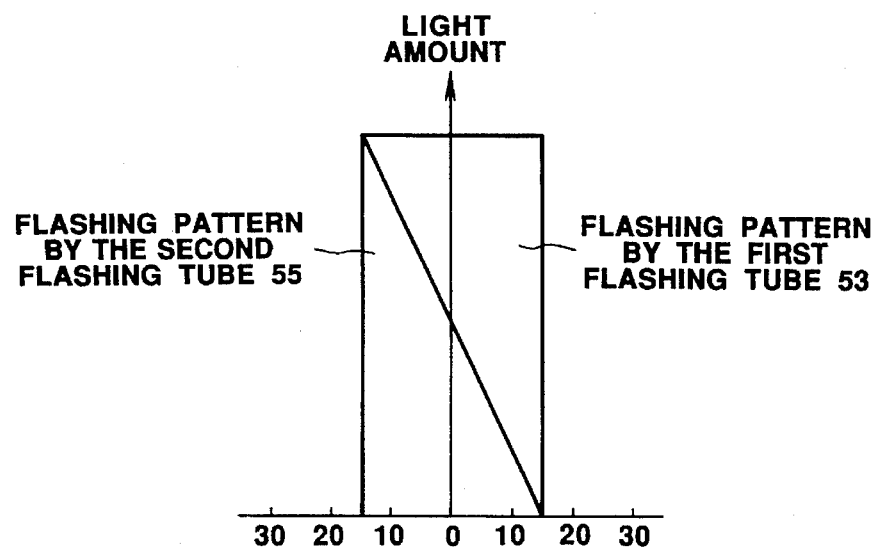
FIG. 38 is a diagram showing the light distribution characteristics in the strobe flashing part in FIG. 37.

In case the user is to set the photographing lens on the tele side, if the zoom button 17 shown in FIG. 21 is operated, the photographing lens system will be moved to the tele side by a zoom driving system not illustrated. Then, the strobe stand 72 will be also moved by an operatively connected member not illustrated, therefore the distance between the strobe flashing window 71 and the strobe stand 72 will successively vary and they will be in the position relation shown in FIG. 37 in the tele state. When both flashing tubes 53 and 55 are fully flashed in this state, as shown in FIG. 38, by the light condensing effect of the Fresnel lens, a uniform light distribution narrow in the light distribution angle but large in the light amount will be able to be obtained. It is quite the same as in the above mentioned wide state that, when the flashing amount of one flashing tube is controlled, a non-uniform light distribution will be obtained. According to this application, the present invention can be efficiently applied also to a camera using a zoom lens.

Figure 39:
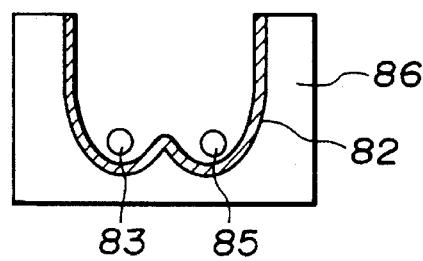
FIG. 39 is a magnified sectioned view of an essential part of a strobe flashing part in a modification of the fourth embodiment.

FIG. 39 is a modification of the fourth embodiment and shows the essential parts of the first and second flashing parts. The difference of this modification from the above mentioned embodiment is that the first and second reflecting shades are made integral so that the two flashing tubes 83 and 85 may be held in this one reflecting shade 82. Here, the first flashing tube 83 and second flashing tube 85 are respectively held by immovable members not illustrated so as not to contact the reflecting shade 82. The other formations are the same as in the fourth embodiment.

In the thus formed above mentioned modification, the method of obtaining a uniform light distribution and non-uniform light distribution is the same as in the fourth embodiment but, as the reflecting shade is usually made of a conductive member, as shown in the above mentioned formation, the reflecting shade 82 is not made to contact the first and second flashing tubes 83 and 85 so that the flashing amounts of both flashing tubes 83 and 85 may be independently controlled. According to this modification, as the reflecting shades are made integral, the formation can be simplified and assembly can be improved.

The fifth embodiment of the present invention shall be explained in the following with reference to FIGS. 40 to 43. In the fourth embodiment and its application and modification, in order to give non-uniform light distribution characteristics within the photographed picture angle to the first and second flashing parts, the curved surface shapes of the two reflecting shades are changed but, in this fifth embodiment, the curved surface shapes of the two reflecting shades are made the same and the relative positions of the flashing tubes to the reflecting shades are changed.

Figure 40:
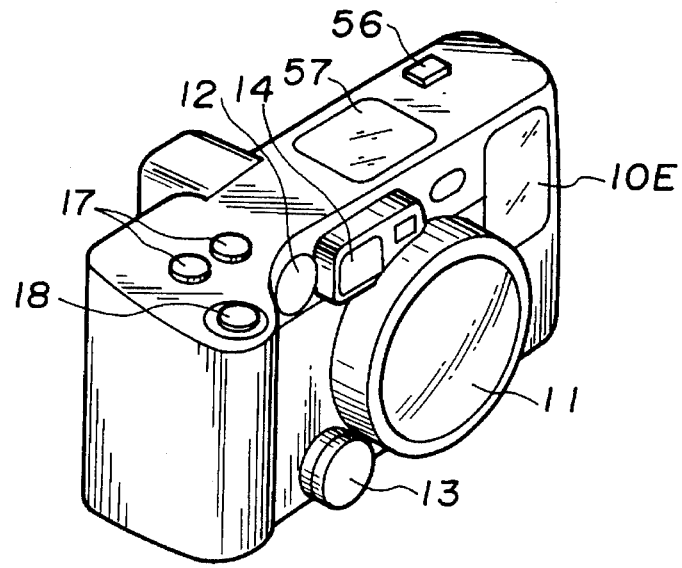

FIG. 40 is a perspective view of a camera having a light distribution variable strobe apparatus built-in. This camera has exactly the same functions as the fourth embodiment in FIG. 21 except for the strobe flashing part 10E. The two flashing parts of this strobe flashing part 10E are formed as shown in the perspective view of the essential part in FIG. 41. The section on arrows 42—42 in FIG. 41 is shown in FIG. 42.

Figure 41:
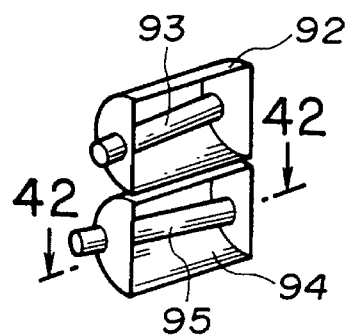
FIG. 41 is a perspective view of an essential part of a strobe flashing part of the strobe apparatus of the fifth embodiment.

As shown in FIG. 41, in this embodiment, a first reflecting shade 92 and second reflecting shade 94 are arranged in the vertical direction and the shapes of the curved surface parts of the two reflecting shades 92 and 94 are the same. The reflecting shades 92 and 94 have respectively a first flashing tube 93 and second flashing tube 95 but both flashing tubes are not in close contact with the reflecting shades, do not intersect at right angles with the photographing optical axis and are inclined as shown in FIG. 42. A first flashing part is formed of the first reflecting shade 92 and first flashing tube 93 and a second flashing part is formed of the second reflecting shade 94 and second flashing tube 95.

Figure 42:
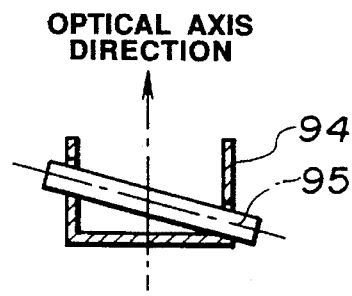
FIG. 42 is a sectioned view on line 42—42 in the strobe flashing part in FIG. 41.
Figure 43:
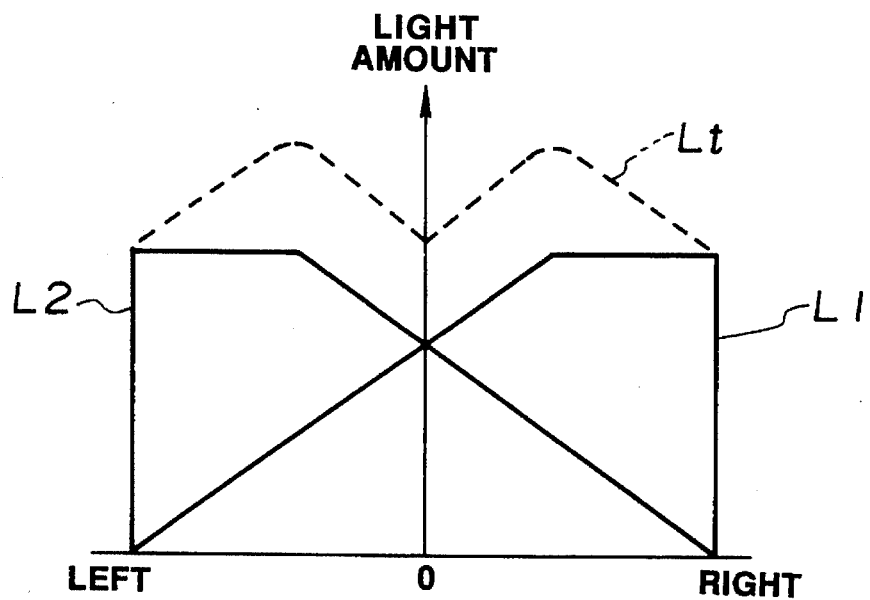
FIG. 43 is a diagram showing the light distribution characteristics in the strobe flashing part in FIG. 41.

In FIG. 42, the second flashing tube 95 is shown as inclined. The first flashing tube 93 not illustrated is arranged as inclined by the same angle in the direction reverse to that of the second flashing tube 95 with respect to the optical axis. Further, to both flashing tubes 93 and 95 is connected the same circuit as the trigger circuit shown in FIG. 30 in the fourth embodiment.

Summarizing the formation of this fifth embodiment, in the reflecting plate of a substantially semi-elliptical cross-section in the diametral direction of the flashing tube forming the respective flashing part, the enclosed flashing tube is secured at one end near the bottom surface of the reflecting plate and at the other end near the opening and one flashing part is arranged in a relation of rotating by 180 degrees the other flashing part of the same formation.

The operation of this fifth embodiment shall be explained in the following. In the light distribution pattern when the inclined first and second flashing tubes 93 and 95 are flashed within the reflecting shades, as shown, for example, in FIG. 43, such non-uniform light distribution characteristics substantially linearly symmetrical with respect to the center axis 0 as are shown by the curve L1 when the first flashing tube 93 is fully flashed and the curve L2 when the second flashing tube 95 is fully flashed will be obtained but will be influenced also by the shape or the like of the reflecting shade. Therefore, in case both flashing tubes 93 and 95 are fully flashed, such uniform light distribution pattern as is shown by the curve Lt in FIG. 43 will be obtained and, in case the flashing amount of either one of the flashing tubes is controlled, a non-uniform light distribution pattern will be able to be obtained.

According to the fifth embodiment, the curved surface shapes of the two reflecting shades 93 and 95 are the same, non-uniform light distribution characteristics are obtained by inclining the flashing tubes within the reflecting shades, therefore the depth dimensions of the strobe flashing part can be made small and the entire apparatus can be made small in the type.

Figure 44:
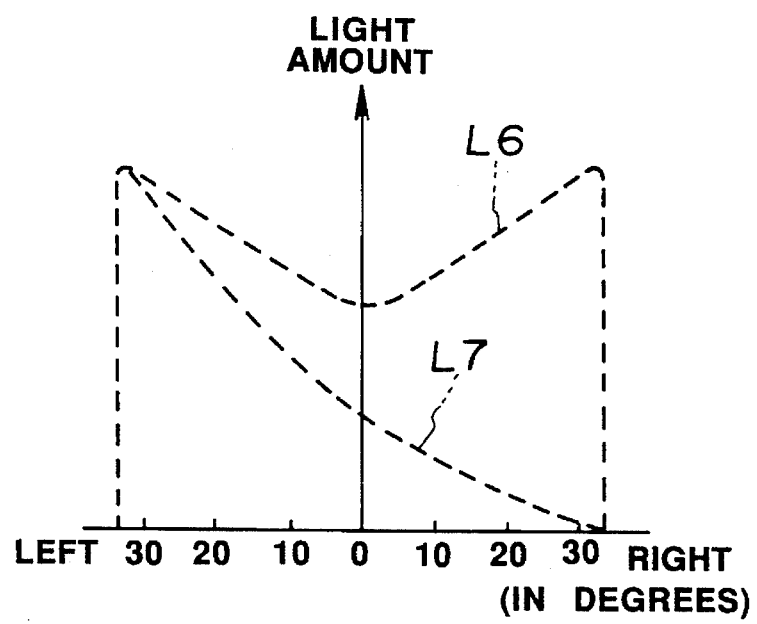
FIG. 44 is a diagram showing a light distribution pattern when the light distribution characteristics within the photographed picture angle are made concave so that the light amount on the image forming surface after passing through the photographing lens may be uniform.
Figure 45:
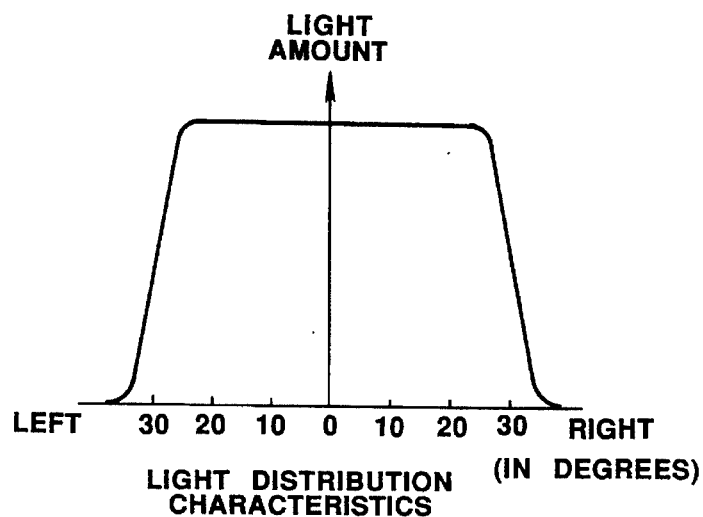
FIG. 45 is a diagram showing light distribution characteristics in the major side direction of the photographed picture in a conventional strobe apparatus.

The respective embodiments, applications and modifications have been explained above. Needless to say, the present invention is not limited to them. For example, the image scenes in the displaying part can be switched steplessly by a dial instead of the selecting means shown in FIG. 34. Further, instead of the light distribution pattern in which, when both flashing parts generate the same light amounts, uniform light distribution characteristics will be made, as shown by the broken lines L3 to L5 in FIGS. 25A, 25B and 26 and the broken lines L6 and L7 in FIG. 44, the center part is made somewhat concave, that is, the flashing amount in the peripheral part is made larger than the flashing amount in the center part to supplement the lack of the light amount on the periphery of the photographing lens so that the density on the image forming surface may be uniform.

In the above mentioned embodiments, the present invention as applied to a camera with a strobe built-in has been explained. However, it is needless to say that the present invention can be applied also to an externally fitted strobe in a camera externally fitted with a strobe apparatus.

Thus, according to the above mentioned embodiments, as a uniform light distribution will be obtained only when the same energy is input into two flashing parts having non-uniform light distribution characteristics with each other, without providing such means of interrupting or diffusing a part of light bundles as in the conventional apparatus, by only controlling the energy ratio of the flashing part, a light distribution pattern having a deviated peak can be obtained. Therefore, a photographing properly exposing a plurality of objects of different object distances in conformity with the photographing state can be easily realized with little energy loss. Also, as the light distribution pattern can be switched at any time by the photographer, a spot-illuminated photographing emphasizing only the light distribution on the main object side can be made.

What is claimed is:

1. A camera with a strobe apparatus comprising:

taking lens means having an optical axis;

distance measuring means for measuring distances of objects in a plurality of places across an image field transverse to said optical axis;

flashing means provided with a first flashing part having a first irradiation axis which intersects the image field and first light distribution characteristics such that an amount of flashing light varies asymmetrically with respect to said first irradiation axis and varies gradually in moving in a first direction across the image field, and a second flashing part having a second irradiation axis which intersects the image field and second light distribution characteristics such that an amount of flashing light amount varies asymmetrically with respect to said second irradiation axis and varies gradually in moving in a second direction across the image field and opposite said first direction;

a flashing amount determining means for determining the respective flashing amounts of said first and second flashing parts responsive to said distance measuring means so as to properly expose at least two objects whose distances have been measured by said distance measuring means;

a flashing controlling means controlling the flashing amounts of said first flashing part and second flashing part in conformity with the respective flashing amounts determined by said flashing amount determining means.

2. A camera with a strobe apparatus according to claim 1 wherein;

each of said first flashing part and second flashing part comprises;

a flashing tube for flashing; and a reflector for reflecting said flashing in a direction of the object; and said reflector has a curved reflecting surface and a first reflecting part extending from one end of said curved reflecting surface and a second reflecting part extending from another end of said curved reflecting surface in which the reflecting curved surface and the first and second reflecting parts being arranged to be asymmetrical relative to an imaginary plane extending through a central axis of said reflector.

3. A camera with a strobe apparatus according to claim 2 characterized in that:

the two flashing parts of said flashing means are so arranged that shapes of the respective reflectors are symmetrical about an imaginary plane located between said reflectors.

4. A camera with a strobe apparatus according to claim 3 characterized in that:

said camera has a camera body with a length measured in a first direction which is greater than a height perpendicular to said length;

the flashing tube of said flashing means having a longitudinal axis arranged in a direction intersecting at right angles with the length direction of the camera.

5. The camera of claim 1 wherein said flashing parts are arranged in side-by-side fashion to form a unified flashing means.

6. A camera with a strobe apparatus according to claim 1, wherein said camera includes a camera body, said flashing means being arranged within said camera body.

7. A camera with a strobe apparatus according to claim 6, wherein said first and second flashing parts are arranged adjacent to one another in said camera body.

8. A camera with a strobe apparatus according to claim 1 wherein:

said first flashing part produces an amount of flashing light continuously decreasing from a higher amount of flashing light adjacent a side of the image field to a lower amount of flashing light adjacent an opposite side of the image field; and wherein said second flashing part produces an amount of flashing light continuously decreasing from a higher amount of flashing light adjacent a side of the image field to a lower amount of flashing light adjacent an opposite side of the image field.

9. A camera with a strobe apparatus according to claim 8 wherein said first flashing part produces a higher amount of flashing light adjacent a first side of the image field and wherein said second flashing part produces a higher amount of flashing light adjacent a second side of the image field, said second side of the image field being opposite to said first side of the image field.

10. A camera with a strobe apparatus according to claim 1, wherein:

said first flashing part comprises a first light emitting portion which irradiates light in a first light direction and said first irradiation axis is parallel with said first light direction and intersects a center point of said light emitting portion; and said second flashing part comprises a second light emitting portion which irradiates light in a second light direction and said second irradiation axis is parallel with said second light direction and intersects a center point of said light emitting portion.

11. A camera with a strobe apparatus comprising:

taking lens means having an optical axis;

distance measuring means for measuring distances of objects in a plurality of places across an image field transverse to said optical axis;

flashing means provided with a first flashing part having a first irradiation axis which intersects the image field and first light distribution characteristics such that an amount of flashing light varies asymmetrically with respect to said first irradiation axis and varies gradually in moving in a first direction across the image field, and a second flashing part having a second irradiation axis which intersects the image field and second light distribution characteristics such that an amount of flashing light amount varies asymmetrically with respect to said second irradiation axis and varies gradually in moving in a second direction across the image field and opposite said first direction;

a flashing amount determining means for determining the respective flashing amounts of said first and second flashing parts responsive to said distance measuring means so as to properly expose at least two objects whose distances have been measured by said distance measuring means;

a flashing controlling means controlling the flashing amounts of said first flashing part and second flashing part in conformity with the respective flashing amounts determined by said flashing amount operating means;

said camera having a camera body with a length measured in a first direction which is greater than a height perpendicular to said length;

said flashing means being provided with:

a first flashing unit having first and second flashing parts whose light distribution characteristics vary in a first direction which corresponds to a direction of the length of said camera body and lies in a plane perpendicular to an optical axis of the camera and which light distribution characteristics of the first and second flashing parts are asymmetrical about an imaginary plane arranged therebetween; and a second flashing unit having two flashing parts in which the light distribution characteristics vary in a second direction intersecting at a right angle with the first direction and in which the light distribution characteristics are asymmetrical about an imaginary plane arranged therebetween;

said distance measuring means including means for selectively measuring the distances of a plurality of points in the first direction and second direction in response to the orientation of the camera; and said flashing controlling means selectively flashing one of said first and second flashing units in response to said selected direction for measuring the distances of the plurality of points.

12. A camera with a strobe apparatus comprising:

distance measuring means for measuring the object distances of a plurality of places within the image field of a photographed picture;

a flashing means having at least two flashing parts, each part having an irradiation axis and respectively different light distribution characteristics each varying asymmetrically with respect to a corresponding irradiation axis;

flashing amount operating means for operating the flashing amounts of said respective flashing parts so as to properly expose the objects in at least two places of the object distances measured by said distance measuring means; and flashing controlling means for controlling the flashing amounts of said flashing means in conformity with the respective flashing amounts determined by said flashing amount operating means.

13. A camera with a strobe apparatus according to claim 12 wherein:

each flashing part comprises:

a flashing tube for flashing; and a reflector for reflecting said flashing in a direction toward the object and having a first reflecting part and second reflecting part, said first and second reflecting parts each having a curved surface and an extension, the reflecting curved surfaces and extensions of said first and second reflecting parts being asymmetrical about an imaginary plane.

14. A camera with a strobe apparatus comprising:

distance measuring means for measuring the object distances of a plurality of places within the image field of a photographed picture;

a flashing means having at least two flashing parts, each part having an irradiation axis and respectively different light distribution characteristics each varying asymmetrically with respect to a corresponding irradiation axis;

flashing amount operating means for operating the flashing amounts of said respective flashing parts so as to properly expose the objects in at least two places of the object distances measured by said distance measuring means; and flashing controlling means for controlling the flashing amounts of said flashing means in conformity with the respective flashing amounts determined by said flashing amount operating means;

said camera having a camera body with a length measured in a first direction which is greater than a height perpendicular to said length;

said flashing means being provided with:

a first flashing unit having two flashing parts in which the light distribution characteristics vary in a first direction which corresponds to a direction of the length of said camera body and lies in a plane perpendicular to an optical axis of the camera, and in which the light distribution characteristics are symmetrical about a first imaginary plane; and a second flashing unit having two flashing parts in which the light distribution characteristics vary in a direction intersecting at a right angle with the lengthwise direction of the camera, and in which the light distribution characteristics are asymmetrical about a second imaginary plane perpendicular to said first imaginary plane;

said distance measuring means selectively measuring the distances of a first plurality of points in the lengthwise direction of the camera or a second plurality of points in a direction intersecting at right angles with the lengthwise direction in response to the orientation of the camera; and said flashing controlling means selectively flashing one of said first and second flashing units in response to the selected direction of measuring the distances of the first and second plurality of points.

15. A strobe apparatus in which a light distribution angle is variable comprising:

first flashing means having a flashing characteristic so that a flashing amount decreases in one direction across a photographed image field;

second flashing means having a flashing characteristic so that a flashing amount changes symmetrically relative to the flashing characteristic of said first flashing means in said one direction of said photographed image field;

common support means for supporting said first and second flashing means adjacent to one another; and a flashing controlling means selectively independently controlling the flashing amount of said first flashing means and said second flashing means.

16. A light distribution angle variable strobe apparatus according to claim 15 wherein:

said first flashing means has:

a first flashing tube for flashing; and a first reflector for reflecting the flashing of said first flashing tube toward an object and extending on one side of said first flashing tube toward said object; and said second flashing means has:

a second flashing tube for flashing; and a second reflector for reflecting the flashing of said second flashing tube toward an object and extending on one side of said second flashing tube which is remote from said one side of said first flashing tube.

17. The camera of claim 15 further comprising a common transparent plate positioned across a front end of said first and second flashing means.

18. A camera according to claim 17 wherein said transparent plate is provided with a Fresnel lens formed along one major surface thereof.

19. A camera with a strobe apparatus according to claim 15 wherein:

said first flashing means produce an amount of flashing light continuously decreasing from a higher amount of flashing light adjacent a first side of the image field to a lower amount of flashing light adjacent an opposite second side of the image field; and wherein said second flashing means produce an amount of flashing light continuously decreasing from a higher amount of flashing light adjacent said second side of the image field to a lower amount of flashing light adjacent said first side of the image field.

20. A light distribution angle variable strobe apparatus which can be fitted to a camera or built-in to a camera comprising:

first flashing means having a first irradiation axis and a first non-uniform light distribution characteristic within the photographed picture angle, the first non-uniform light characteristic varying asymmetrically with respect to said first irradiation axis;

second flashing means having a non-uniform light distribution characteristic substantially linearly symmetrical with the light distribution characteristic of the first flashing means with respect to a center axis within said photographed picture angle;

common support means for supporting said first and second flashing means adjacent to one another; and controlling means for independently controlling the flashing amounts of said first and second flashing means.

21. A light distribution angle variable strobe apparatus according to claim 20 characterized in that the light distribution characteristics of said first and second flashing means are non-uniform in a lengthwise direction of the photographed picture.

22. A light distribution angle variable strobe apparatus according to claim 20 characterized in that the combination of the light amounts by said first and second flashing means can be switched in at least three ways by selective operation of an operating member.

23. A light distribution angle variable strobe apparatus according to claim 20 characterized in that each of said first and second flashing means includes a reflecting plate having a surface forming a semi-elliptical shape, and a flashing tube having a longitudinal axis arranged near a focus of said semi-elliptical shaped portion.

24. A light distribution angle variable strobe apparatus which can be fitted to a camera or built-in to a camera comprising:

first flashing means having a first irradiation axis and a first non-uniform light distribution characteristic within the photographed picture angle, the first non-uniform light characteristic varying asymmetrically with respect to said first irradiation axis;

second flashing means having a non-uniform light distribution characteristic substantially linearly symmetrical with the light distribution characteristic of the first flashing means with respect to a center axis within said photographed picture angle;

common support means for supporting said first and second flashing means adjacent to one another;

controlling means for independently controlling the flashing amounts of said first and second flashing means; and the light distribution characteristics of said first and second flashing means being adjusted so that, when the light amounts by said first and second flashing means are the same, the light distribution across the image field and within the photographed picture angle has a concave shape and, after passing through a photographing lens, the light amount on an image forming surface is substantially uniform.

25. A light distribution angle variable strobe apparatus which can be fitted to a camera or built-in to a camera comprising:

first flashing means having a first irradiation axis and a first non-uniform light distribution characteristic within the photographed picture angle, the first non-uniform light characteristic varying asymmetrically with respect to said first irradiation axis;

second flashing means having a non-uniform light distribution characteristic substantially linearly symmetrical with the light distribution characteristic of the first flashing means with respect to a center axis within said photographed picture angle;

common support means for supporting said first and second flashing means adjacent to one another;

controlling means for independently controlling the flashing amounts of said first and second flashing means; and the first and second flashing means each comprising a reflecting plate of substantially semi-elliptical shape in cross-section and a flashing tube having a longitudinal axis which is offset relative to a longitudinal focus of said semi-elliptical shape.

26. A light distribution angle variable strobe apparatus according to claim 25 wherein said reflecting plates are asymmetrical about a central plane.

27. A camera with a strobe apparatus comprising:

said camera having a camera body with a length measured in a first direction which is greater than a height perpendicular to said length;

first flashing means for generating a flashlight having a first irradiation axis and a first non-uniform characteristic across an image field, said characteristic being asymmetrical with respect to said first irradiation axis in a given direction which corresponds to a direction of the length of said camera body and laying in a plane perpendicular to an optical axis;

second flashing means for generating a flashlight having a non-uniform characteristic across the image field, the non-uniform light characteristic of said second flashing means being opposite that of the first flashing means along said given direction, said first and second flashing means being arranged on opposite sides of and equi-distant from a central plane substantially parallel to an optical axis of the camera;

common support means for supporting said first and second flashing means adjacent to one another; and means for selectively and independently operating each of said first and second flashing means.

28. The camera of claim 27 wherein said control means operates said first and second flashing means when in a first operating state whereby the combined flashlight from said first and second flashing means produces a substantially uniform light distribution characteristic across said image field.

29. The camera of claim 28 wherein said control means has a second operating state for operating only one of said first and second flashing means.

30. The camera of claim 29 wherein said control means has a third operating state for operating only a remaining one of said first and second flashing means not operated when said control means is in said second state.

31. The camera of claim 27 wherein the control means operates said first and second flashing means for equal time intervals to generate a combined light distribution characteristic which is substantially uniform across the image field.

32. A camera with a strobe apparatus comprising:

said camera having a camera body with a length measured in a first direction which is greater than a height perpendicular to said length;

first flashing means for generating a flashlight having a first irradiation axis and a first non-uniform characteristic across an image field, said characteristic being asymmetrical with respect to said first irradiation axis in a given direction which corresponds to a direction of the length of said camera body and laying in a plane perpendicular to an optical axis;

second flashing means for generating a flashlight having a non-uniform characteristic across the image field, the non-uniform light characteristic of said second flashing means being opposite that of the first flashing means along said given direction, said first and second flashing means being arranged on opposite sides of and equi-distant from a central plane substantially parallel to an optical axis of the camera;

common support means for supporting said first and second flashing means adjacent to one another;

control means for selectively and independently operating each of said first and second flashing means; and the control means operating in a second state to maintain the first and second flashing means operating for different time intervals to provide a composite light distribution characteristic which is non-uniform across the image field and which varies gradually in moving in a first direction across said image field.

33. The camera of claim 32 wherein the control means operates in a third state to maintain the first and second flashing means operating for different time intervals to provide a composite light distribution characteristic which is non-uniform across the image field and which varies gradually in moving in a second direction across said image field opposite said first direction.

34. Flash means for selectively providing a radiation pattern across an image field whose intensity may be selected from one of a constant intensity across the image field and an intensity which increases in moving across the image field, comprising:

first and second flash units each having a flash tube and a reflector and an irradiation axis defined by said flash tube and said reflector, said reflector having a curved section with first and second ends, said first end of said curved section having one end of a substantially straight section joined to said first end of said curved section and extending away from said first end and generally toward an object to be photographed, thereby causing the amount of light projected by each flash unit to vary asymmetrically with respect to the irradiation axis of the same flash unit;

said flash tubes being positioned so that the curved portion of its associated reflector partially surrounds the flash tube; and said flash units being arranged with the second end of the reflector of said first flash unit and the second end of the reflector of said second flash unit being positioned adjacent to one another.

35. The flash means of claim 34 wherein said flash tubes are elongated tubes and arranged so that their longitudinal axes are substantially parallel to one another.

36. The flash means of claim 34 wherein the second ends of the reflectors of said first and second flash units are joined to one another.

37. The flash means of claim 34 further comprising a transparent member positioned so that light emitted from said flash units for illumination of an object passes through said transparent member.

38. The flash means of claim 37 wherein said transparent member is a Fresnel lens.

39. The flash means of claim 34 wherein the reflectors of said flash units have a substantially J-shaped contour.

40. The flash means of claim 34 wherein opposing sides of said reflectors are each provided with reflector side members, said flash tubes having opposing ends, each end extending through an opening in a side member of its associated reflector.

41. Flash means for selectively providing a radiation pattern across an image field whose intensity may be selected from one of a constant intensity across the image field and an intensity which increases in moving across the image field, comprising:

first and second flash units each comprising a curved reflector and a flash tube;

each reflector having a back portion aligned substantially perpendicular to an optical axis extending in a direction of an image field to be illuminated;

each flash tube having a longitudinal axis which is offset at an angle relative to a rear of the curved reflector to cause illumination from said flash unit to increase from one end of the flash unit to an opposite end thereof;

said flash units being arranged so that the curved reflectors are arranged side-by-side with an end of one reflector being adjacent to an end of the other reflector and said flash tubes being arranged so that their longitudinal axes are diagonally aligned in opposing directions.

42. The flash means of claim 41 wherein opposing sides of said reflectors are each provided with reflector side members, said flash tubes having opposing ends, each end extending through an opening in a side member of its associated reflector.

43. The flash means of claim 41 further comprising a transparent member positioned so that light emitted from said flash units for illumination of an object passes through said transparent member.

44. The flash means of claim 43 wherein said transparent member is a Fresnel lens.

45. The camera of claim 42 wherein said unified flashing means is built into a camera body of said camera.

\* \* \* \* \*